(12) United States Patent
Meza

(10) Patent No.: US 12,377,903 B1
(45) Date of Patent: Aug. 5, 2025

(54) DEVICE FOR REMOVABLY ATTACHING STEERING WHEEL TO STEERING COLUMN OF VEHICLE

(71) Applicant: Avanti Heritage Works, LLC, Fullerton, CA (US)

(72) Inventor: Matthew Alonso Meza, Chiloquin, OR (US)

(73) Assignee: Avanti Heritage Works, LLC, Fullerton, CA (US)

( * ) Notice: Subject to any disclaimer, the term of this patent is extended or adjusted under 35 U.S.C. 154(b) by 0 days.

(21) Appl. No.: 19/083,839

(22) Filed: Mar. 19, 2025

(51) Int. Cl.
  *B62D 1/10* (2006.01)

(52) U.S. Cl.
  CPC ..................... *B62D 1/10* (2013.01)

(58) Field of Classification Search
  CPC ........................................... B62D 1/10
  See application file for complete search history.

(56) References Cited

U.S. PATENT DOCUMENTS

| | | | | |
|---|---|---|---|---|
| 3,796,112 A * | 3/1974 | Hoffman | ............... | B62D 1/10 74/495 |
| 5,855,449 A * | 1/1999 | Thomas | ............... | B62D 1/10 74/552 |
| 5,855,451 A * | 1/1999 | Milton | ............... | B62D 1/10 74/552 |
| 7,527,293 B1 * | 5/2009 | Wang | ............... | B62D 1/10 280/771 |
| 7,621,200 B2 * | 11/2009 | Ichikawa | ............... | B60R 25/0222 74/555 |
| 9,821,765 B1 * | 11/2017 | Miller | ............... | B62D 1/10 |
| 2005/0097982 A1 * | 5/2005 | Li | ............... | B60R 25/0222 74/552 |
| 2013/0118297 A1 * | 5/2013 | Goh | ............... | B62D 1/10 74/552 |
| 2015/0016878 A1 * | 1/2015 | Isaacson | ............... | B62D 1/10 403/374.2 |

OTHER PUBLICATIONS

Works Bell RAPFIX; https://web.archive.org/web/20030417184944/http://www.worksbell.co.jp/products/rapfix/; Published Apr. 17, 2003.*

* cited by examiner

Primary Examiner — Adam D Rogers
(74) Attorney, Agent, or Firm — DANE IP Law PC

(57) ABSTRACT

A modular steering wheel assembly allows for quick and secure attachment and removal of a steering wheel in vehicles or gaming setups. A steering wheel mount connects to a core via an audible rotating lock mechanism, enabling fast locking and unlocking. The core attaches to a hub mount using a pull-activated detent mechanism biased to an engaged position by a spring, ensuring stability during use. An asymmetric engagement interface ensures proper alignment, preventing incorrect attachment. A docking station provides convenient storage for unused steering wheels, keeping them organized and easily accessible. This system allows users to switch between different steering wheels without tools, enhancing customization for various driving conditions. By integrating secure and efficient locking mechanisms, the assembly offers a reliable, user-friendly solution for professional drivers, racing enthusiasts, and gaming applications where quick steering wheel changes are required.

19 Claims, 25 Drawing Sheets

DEVICE FOR REMOVABLY ATTACHING STEERING WHEEL TO STEERING COLUMN OF VEHICLE

CROSS REFERENCE TO RELATED APPLICATIONS

Not Applicable.

STATEMENT RE: FEDERALLY SPONSORED RESEARCH/DEVELOPMENT

Not Applicable.

BACKGROUND

The various aspects and embodiments described herein relate to enabling a steering wheel to be removably attachable to a steering column of a vehicle.

Devices exist that enable a steering wheel to the removably attachable to a steering column of a vehicle. However, they are not optimal.

Accordingly, there is a need in the art for an improved device.

BRIEF SUMMARY

A modular steering wheel assembly enables users to quickly swap steering wheels in vehicles or gaming setups, offering customization, convenience, and secure storage. A steering wheel mount is removably attachable to a core using an audible rotating lock mechanism, allowing for quick engagement and disengagement. The core is removably connectable to a hub mount through a pull-activated detent mechanism, which is biased to an engaged position by a spring. This structure allows for seamless transitions between different steering wheels while maintaining precise alignment through an asymmetric engagement interface and locating pins. One or more docking stations can be used to provide a dedicated storage solution for unused steering wheels, keeping them protected and easily accessible. By integrating fast and secure locking mechanisms, this design enables effortless customization for different driving conditions, making it ideal for professional drivers, racing enthusiasts, and gaming applications where quick and reliable steering wheel changes are essential.

More particularly, a steering wheel assembly includes a steering wheel mount attached to a central portion of a steering wheel. A core is quickly and removably attachable to the steering wheel mount using an audible rotating lock mechanism. A hub mount is removably attachable to a hub, which is fixed to a steering column. The core is quickly and removably attachable to the hub mount using a pull-activated detent mechanism biased to an engaged position by a spring.

The detent mechanism includes a pin that slides within a recess in the body of the core. The pin moves between an engaged position to secure the hub mount and a disengaged position to allow removal.

A hub mount release lever moves between an engaged and a disengaged position. In the engaged position, the pin secures the hub mount to the core. In the disengaged position, the pin can move, allowing removal of the hub mount.

The spring in the detent mechanism is a wave spring. The wave spring biases the hub mount release lever to the engaged position. It is positioned between the hub mount release lever and the rotating steering wheel mount lever.

The rotating lock mechanism may have an audible feedback and may include the steering wheel mount lever and the steering wheel mount. A first thread is located on the steering wheel mount. A second thread is located on the steering wheel mount lever. Rotating the steering wheel mount lever clockwise engages the second thread with the first thread, securing the steering wheel to the core. Rotating the steering wheel mount lever counterclockwise disengages the threads, allowing removal of the steering wheel.

A spring-loaded ball detent is positioned on a flange of the core's body. A recess is formed on the steering wheel mount lever. The ball detent fits into the recess when the steering wheel mount lever is engaged. The ball detent prevents unintended movement of the lever during use.

A docking station secures an unused steering wheel when detached from the core. The docking station shares the same configuration as the core body but does not include a rotating steering wheel mount lever. To secure the steering wheel, it is first attached in a 30° clockwise position and then rotated 30° counterclockwise to lock into the docking station. The docking station is fixedly mounted to a flat surface, such as a wall.

The steering wheel mount includes an external distal end portion. This portion aligns with a recess proximal end portion of the hub mount to ensure proper orientation when attaching the steering wheel to the core.

The external distal end portion has a polygonal shape. The recess proximal end portion has a mating polygonal shape.

The polygonal shape is skewed to allow the external distal end portion to be inserted into the recess proximal end portion in only one orientation. This ensures the steering wheel is aligned correctly with the steering column.

The tactile rotating lock mechanism provides audible or tactile feedback (i.e., clicking noise) when the steering wheel mount is secured to the core.

The core and hub are designed for use in both vehicle steering systems and video game simulation setups.

A docking station is attachable to a flat surface. The docking station allows a steering wheel with an attached steering wheel mount to be securely stored. This provides a convenient place to store the steering wheel when not in use in a vehicle or a video game simulation setup.

In another aspect, a method for removing a steering wheel from a vehicle includes steps of providing a steering assembly with a steering wheel mount, a core, and a hub mount attached to a hub and steering column; rotating the steering wheel mount lever to disengage the rotating lock mechanism, separating the steering wheel mount from the core.

In another aspect, a method for attaching a steering wheel to a vehicle includes the steps of providing a steering assembly with a steering wheel mount, a core, and a hub mount attached to a hub and steering column, aligning an external distal end portion of the steering wheel mount with a recess proximal end portion of the hub mount, inserting the external distal end portion into the recess proximal end portion, rotating the steering wheel mount lever to engage the rotating lock mechanism to secure the steering wheel mount and steering wheel to the core.

In another aspect, a method for removing a steering wheel from a vehicle includes the steps of providing a steering assembly with a steering wheel mount, a core, and a hub mount attached to a hub and steering column, pulling the hub mount release lever to disengage the detent mechanism, which releases the core from the hub mount, and separating the steering wheel, steering wheel mount, and core from the hub mount.

In another aspect, a method for attaching a steering wheel to a vehicle includes the steps of providing a steering assembly with a steering wheel mount, a core, and a hub mount attached to a hub and steering column, aligning an internal distal end portion of the body of the core with a proximal end portion of the hub mount, partially inserting the internal distal end portion onto the proximal end portion, pulling the hub mount release lever to move the detent pins to a disengaged position, fully inserting the internal distal end portion onto the proximal end portion, and releasing the hub mount release lever to move the detent pins back to an engaged position, securing the core onto the hub mount.

In another aspect, a method for attaching a steering wheel to a steering column of a vehicle or to a simulation-based steering system is disclosed. The method may comprise the steps of: providing a steering assembly comprising a steering wheel mount attached to the steering wheel, a core, and a hub mount attached to a hub, wherein the hub is attached to either a vehicle steering column or a simulation-based steering system; aligning an internal distal end portion of a body of the core with an external proximal end portion of the hub mount; partially inserting the internal distal end portion of the body of the core onto the external proximal end portion of the hub mount; pulling on a hub mount release lever of the core to traverse pins to a disengaged position; completely inserting the internal distal end portion of the body of the core onto the external proximal end portion of the hub mount; and releasing the hub mount release lever to traverse the pins to an engaged position, securing the steering wheel, steering wheel mount, and core onto the hub mount.

In an aspect of the steering wheel assembly, all metal components of the rotating lock mechanism and the pull-activated detent mechanism comprise an anodized surface layer. The anodized surface layer is applied to reduce friction, or to prevent galling, or to maintain precise tolerances between mating components. The anodized surface layer enables smooth rotational or linear movement between contacting parts. The anodized surface layer is a hard-anodized coating applied to all mating and load-bearing surfaces within the core, steering wheel mount, and hub mount, wherein the hard anodizing process increases surface hardness, or wear resistance, or anti-galling properties under high loads and repeated mechanical engagement.

In another aspect, the anodized surface layer is replaced with an alternative low-friction coating, wherein the alternative coating comprises at least one of a PTFE (polytetrafluoroethylene) coating applied to at least one of: reducing friction, improving smooth operation between sliding or rotating components, enhancing movement under spring pressure, reducing surface wear; or a Physical Vapor Deposition (PVD) coating applied to at least one of: increasing surface hardness, improving wear resistance, preventing material transfer between mating components, enhancing long-term durability under repeated mechanical engagement or disengagement cycles.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 24:
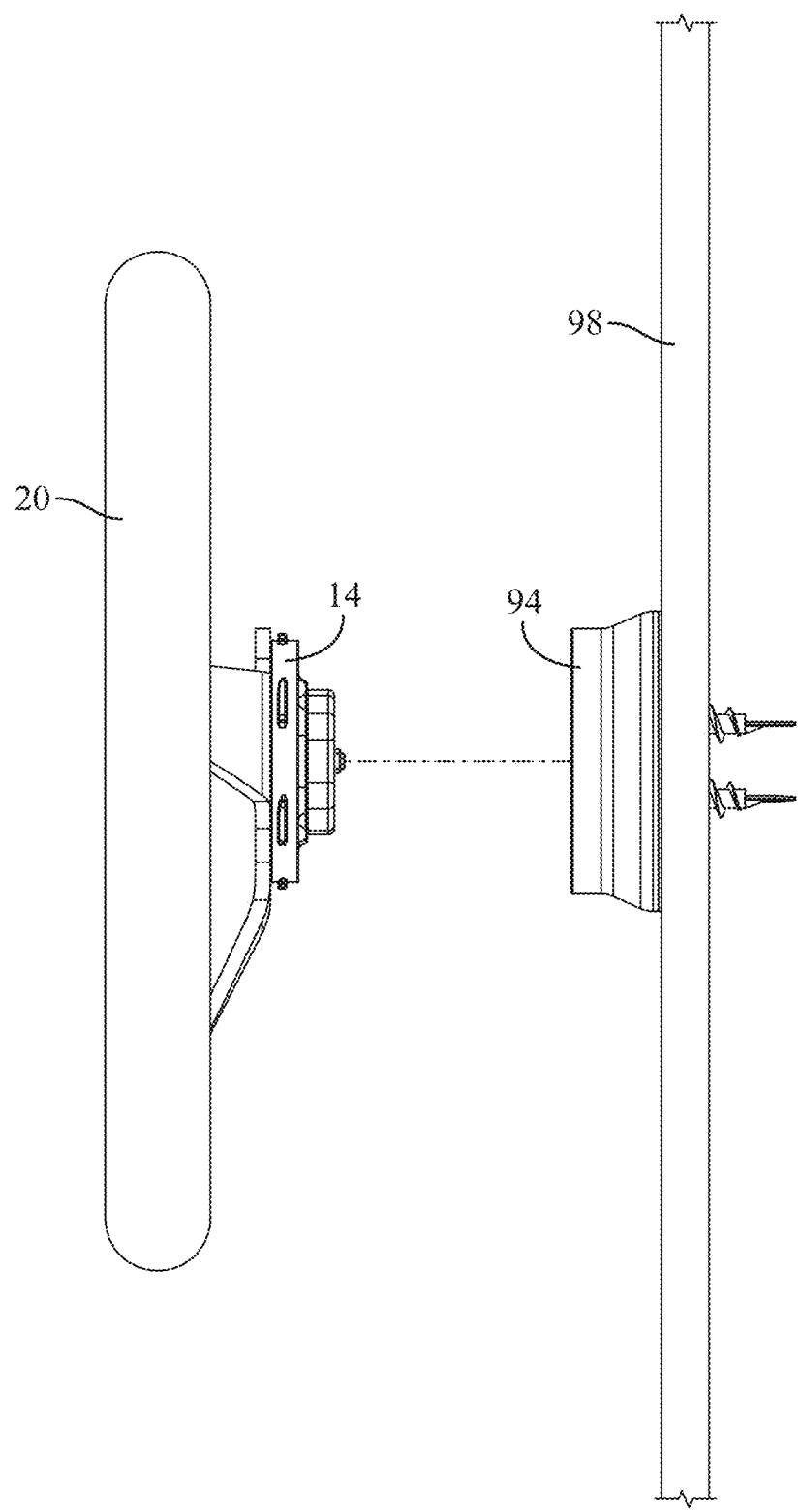
FIG. 24 illustrates a steering wheel being attachable to a wall mounted docking station using a steering wheel mount.

The steering wheel assembly 10 (see FIG. 2) allows drivers to quickly switch between different steering wheels 20 for use in vehicles or video game setups. This enables customization for different steering wheel preferences while providing a convenient way to store unused steering wheels on a wall 98—mounted docking station 94 (see FIG. 24). The assembly achieves this through a modular design featuring a steering wheel mount 14 (see FIGS. 1 and 4), a core 22 (see FIGS. 1, 4 and 7), and a hub mount 30 (see FIGS. 1, 4 and 7), which allow for secure attachment and quick release of the steering wheel 20 from the set up.

Figure 1:
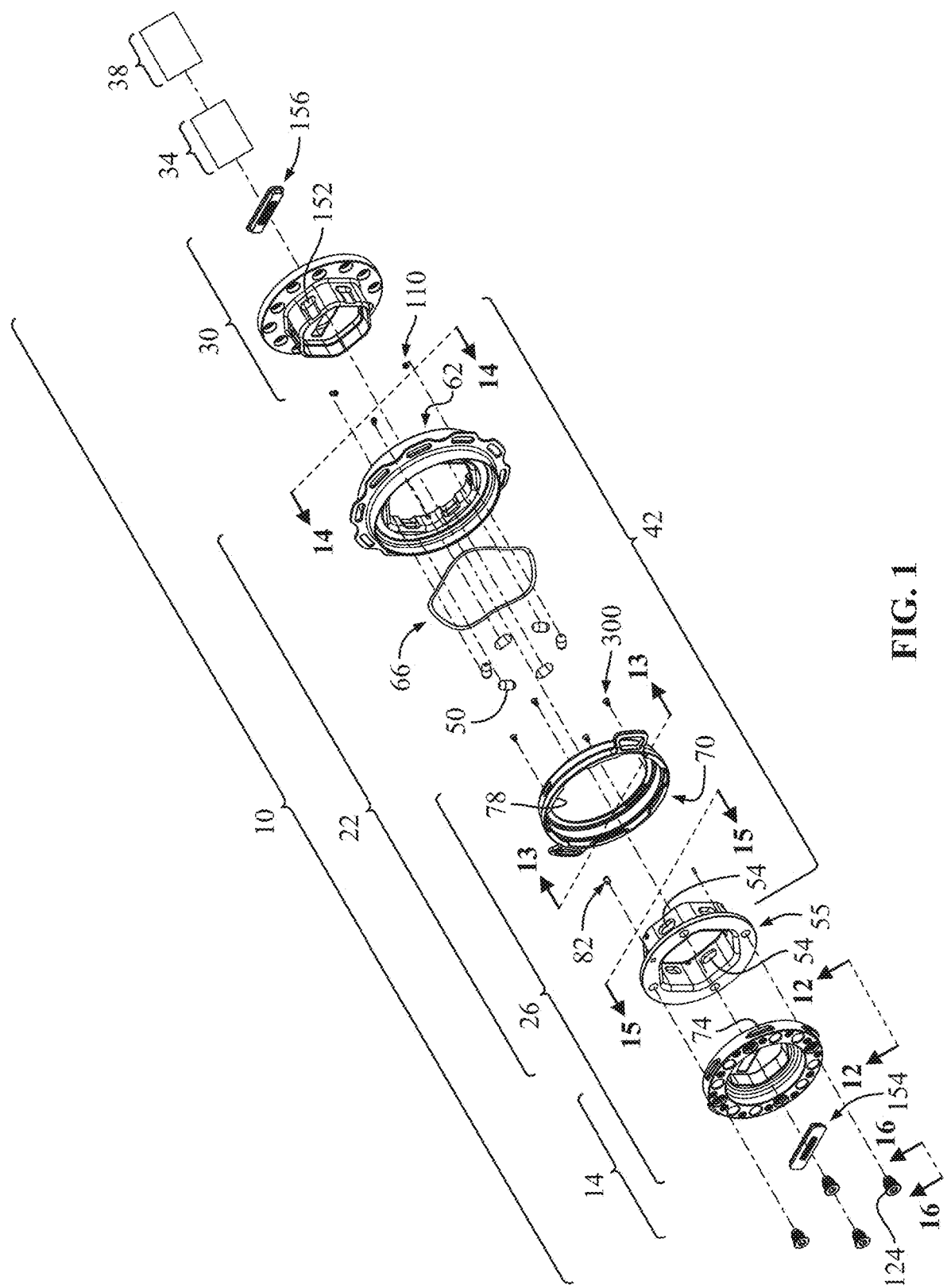
FIG. 1 is an exploded perspective view of the steering wheel assembly, showing the steering wheel mount, core, hub mount, and hub in relation to the steering column.
Figure 3:
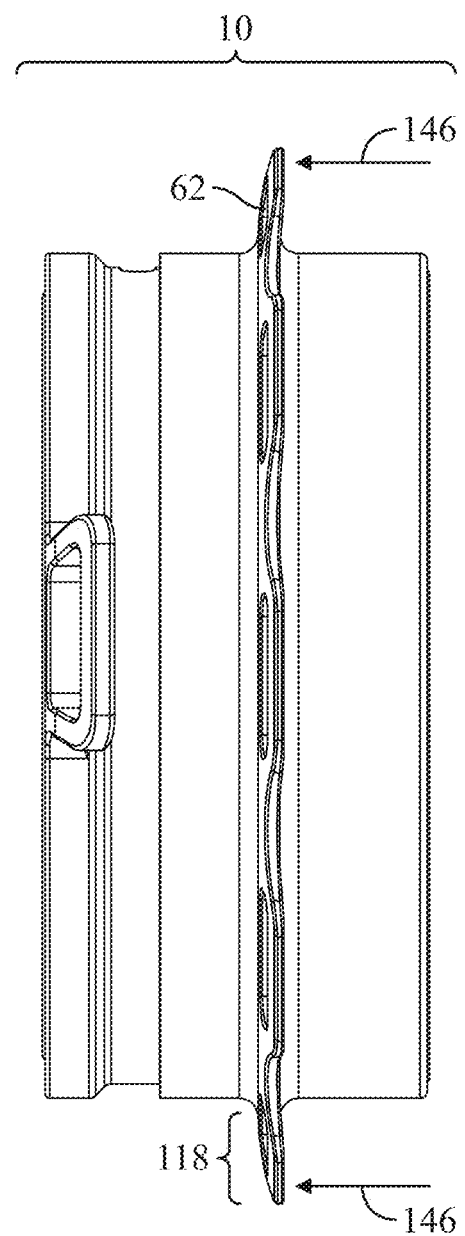
FIG. 3 is a side view of the fully assembled steering wheel assembly shown in FIG. 2.
Figure 23:
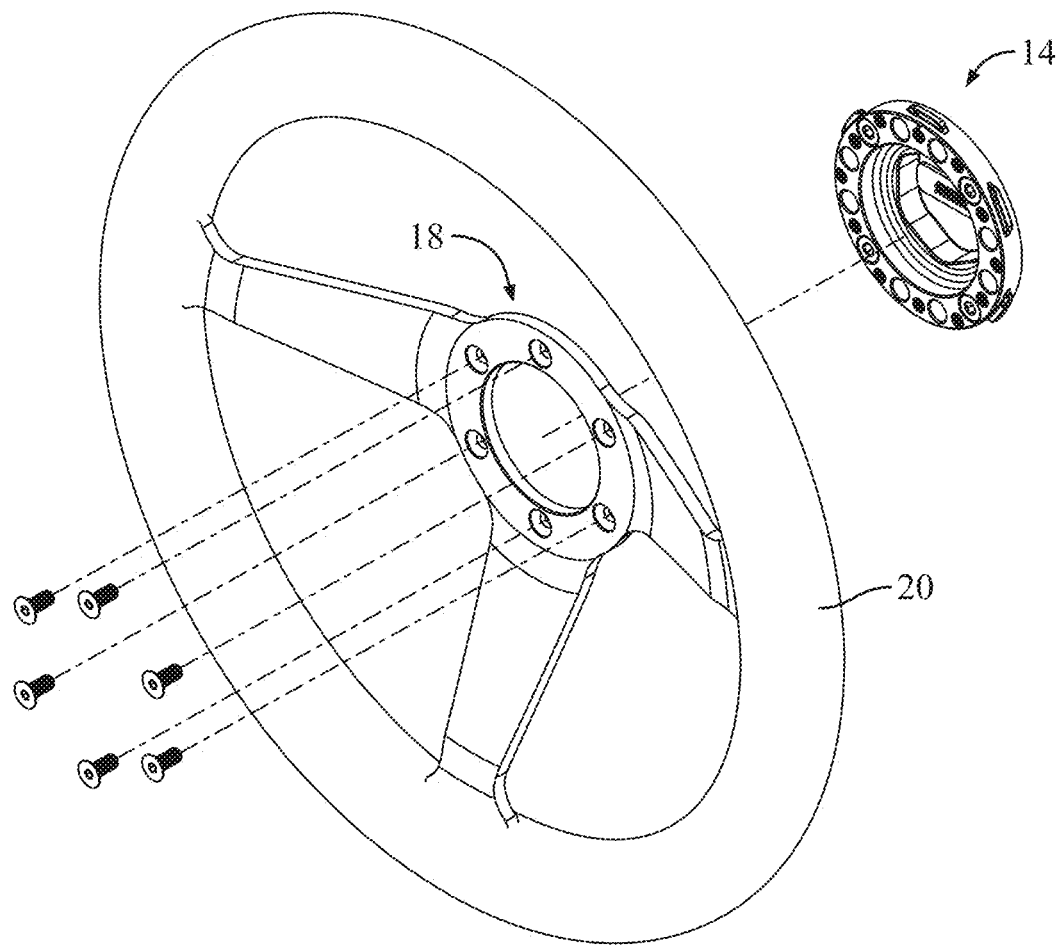
FIG. 23 illustrates a steering wheel and central portion of the steering wheel.

The steering wheel mount 14 attaches to the central portion 18 of the steering wheel 20 (see FIG. 23) and connects to the core 22 via an audible feedback rotating lock mechanism 26 (see FIG. 1). This mechanism uses a rotating steering wheel mount lever 70 (see FIGS. 1, 4, and 13) that engages first and second threads 74, 78 (see FIGS. 4, 9A, and 9B), allowing for a secure but easily releasable connection. The core 22, in turn, connects to the hub mount 30 via a pull-activated detent mechanism 42 (see FIGS. 1, 7, and 8), which uses a spring-biased pin 50 that locks into place (see FIGS. 7, 8, and 21). A hub mount release lever 62 (see FIGS. 1, 3, and 5) allows the pin 50 to retract for quick detachment.

By integrating these locking mechanisms, the assembly 10 ensures a secure yet easily removable connection between components, enabling seamless steering wheel changes while maintaining durability and reliability during use.

The assembly of the core 22 (see FIGS. 1 and 4) involves integrating multiple components to create a secure and functional selectively removable connection with the steering wheel mount 14 and the hub mount 30. The core 22 includes the rotating steering wheel mount lever 70 (see FIGS. 4, 13, and 20), the hub mount release lever 62 (see FIGS. 1, 3, 5, and 20), the detent mechanism 42 (see FIGS. 1, 7, and 8), and supporting features such as springs, detents, and limit screws to ensure smooth operation. Each part must be installed in a precise order to achieve the intended locking and release functionality.

Figure 12:
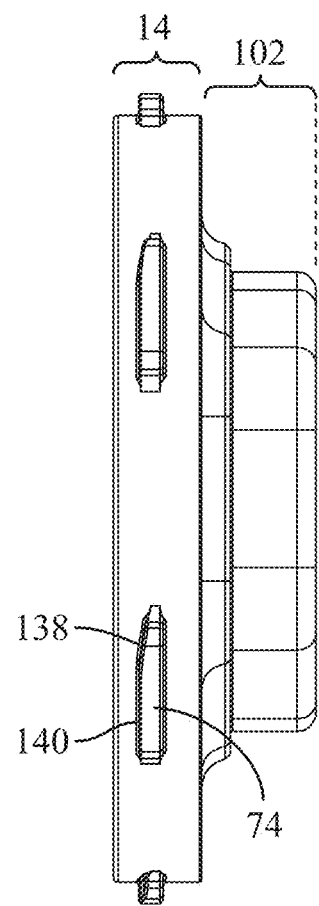
FIG. 12 is a side view of the steering wheel mount as shown in FIG. 1.
Figure 19:
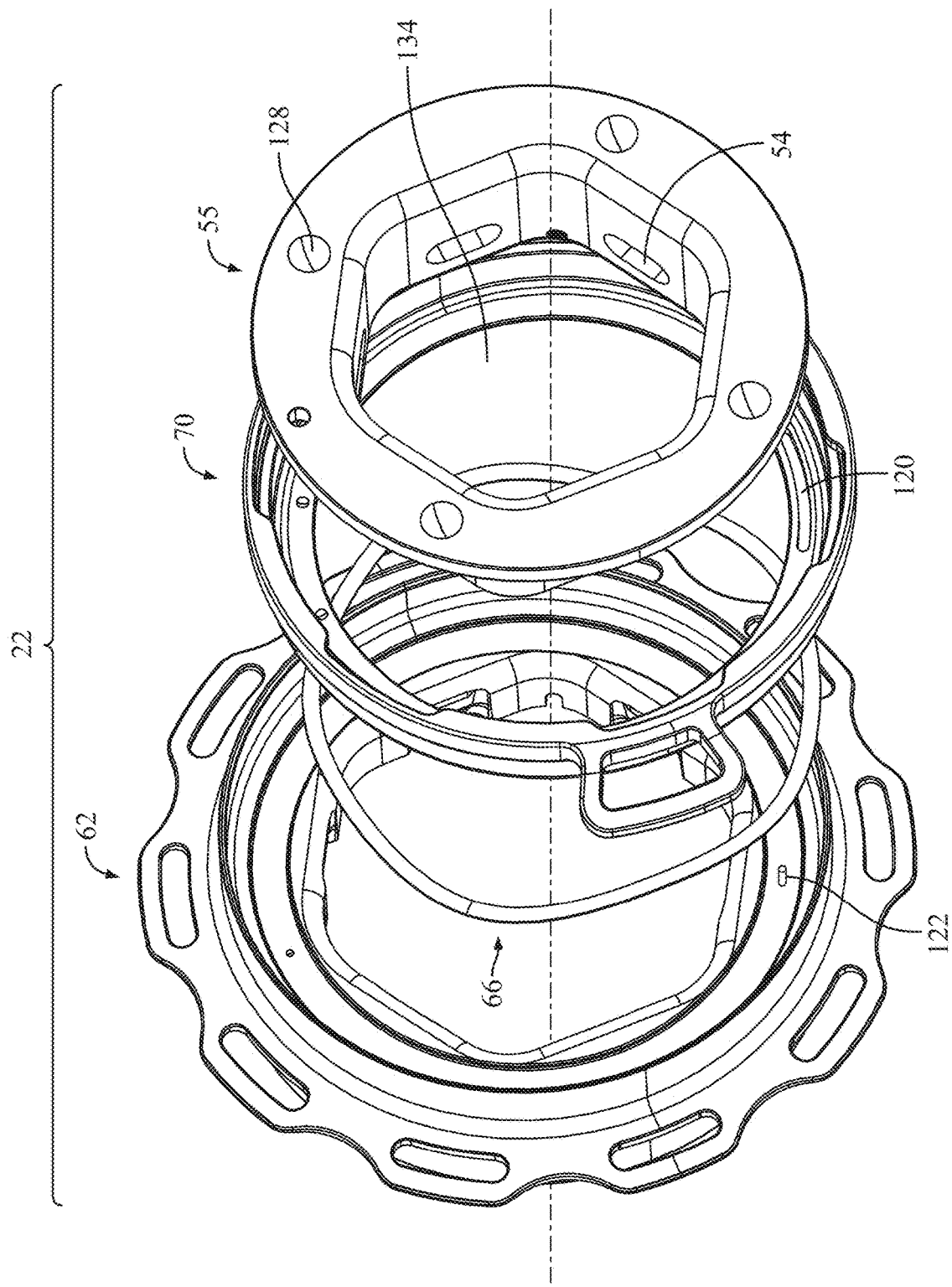
FIG. 19 is a front exploded perspective view of the core.
Figure 20:
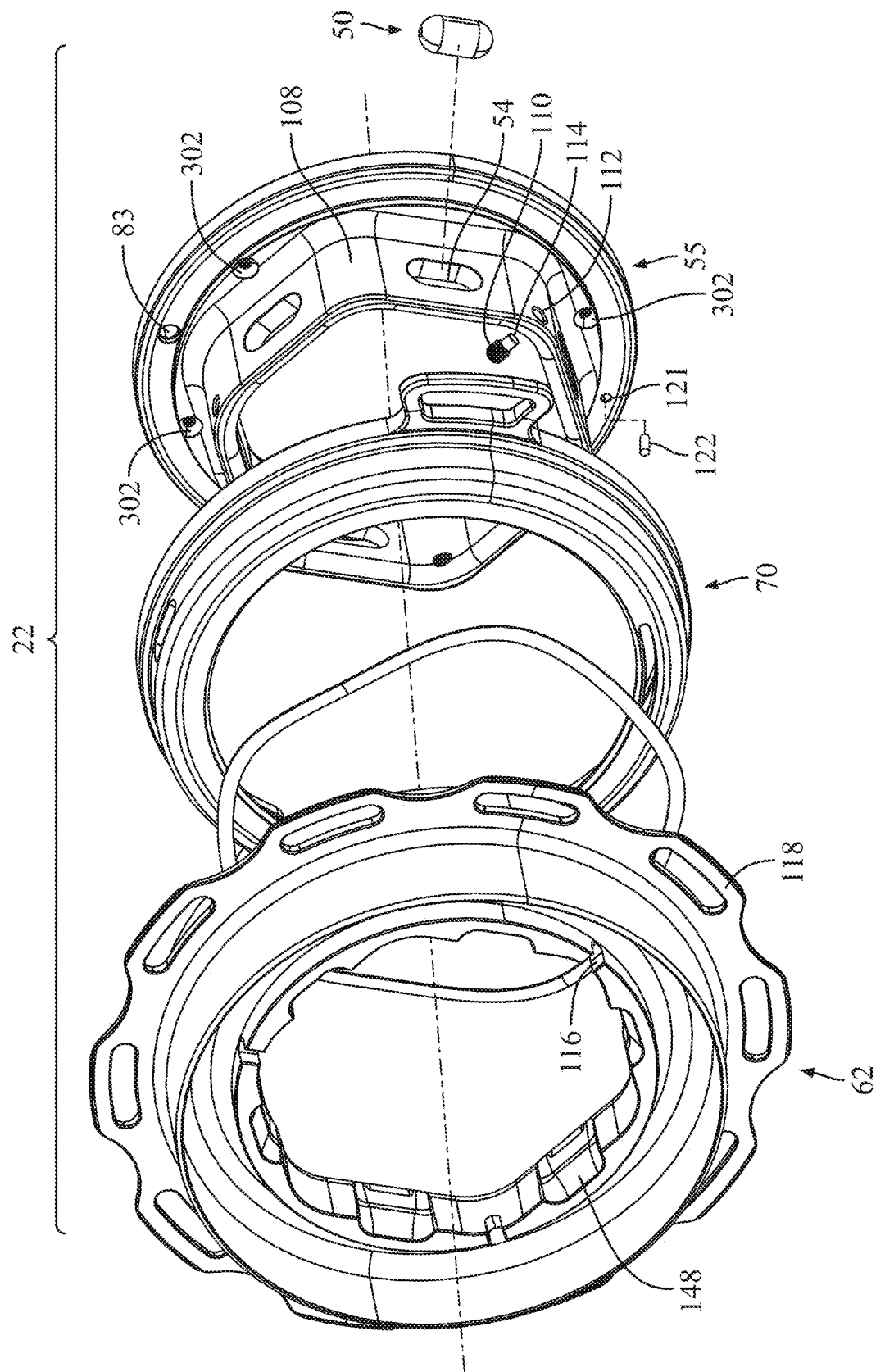
FIG. 20 is a rear exploded perspective view of the core.

Assembly begins by positioning the rotating steering wheel mount lever 70 onto the body 55 of the core 22 so that it circumscribes the distal end portion 108 of the body 55 (see FIG. 20). The lever 70 is coaxially aligned with the body 55, allowing it to rotate between engaged and disengaged positions. The pin 122 is installed within the hole 121 (see FIG. 20) in the body 55 of the core 22. The curved slot 120 in the lever 70 (see FIG. 19) receives a pin 122 (see FIG. 19), which limits the rotational movement of the lever 70. The first thread 74 (see FIG. 12) on the steering wheel mount 14 is aligned with gaps 132 in the lever 70, allowing engagement with the second thread 78 on the steering wheel mount lever 70 when rotated (see FIGS. 4, 9A, and 9B).

Next, the spring-loaded ball detent 82 (see FIGS. 1 and 20) is inserted into hole 83 (see FIG. 20) in the body 55 of the core 22. This detent 82 provides audible feedback when the steering wheel mount lever 70 reaches the engaged position by locking into a recess 90 or 90a (see FIGS. 5, 10, 11, 13 and 13A). The ball detent 82 ensures that the lever 70 remains in place in the engaged position during use and prevents unintended disengagement.

Figure 9A:
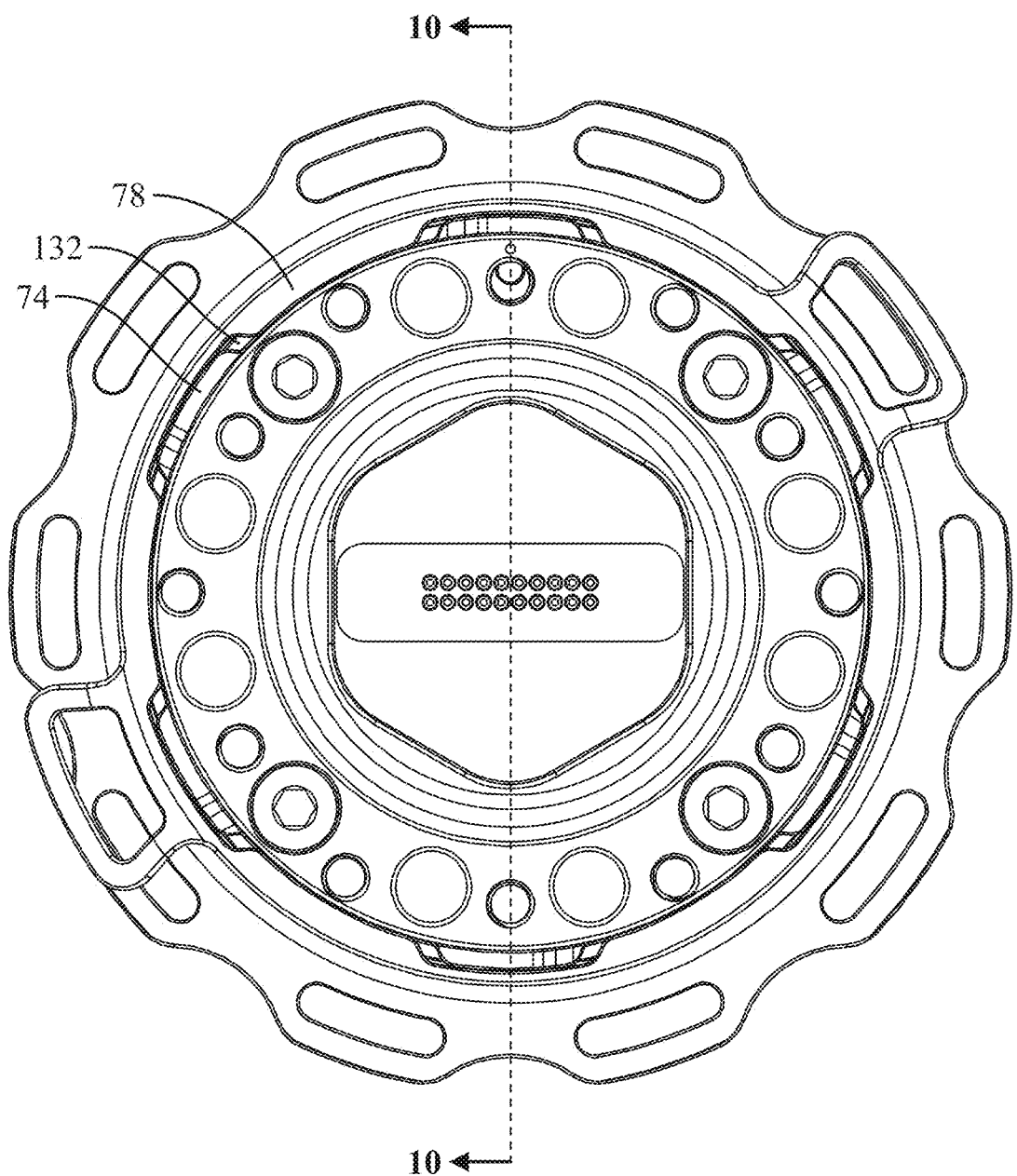
FIG. 9A is a front view of the fully assembled steering wheel assembly as shown in FIG. 2, illustrating the disengaged position of the steering wheel mount lever, allowing removal of the steering wheel mount from the core.
Figure 10:
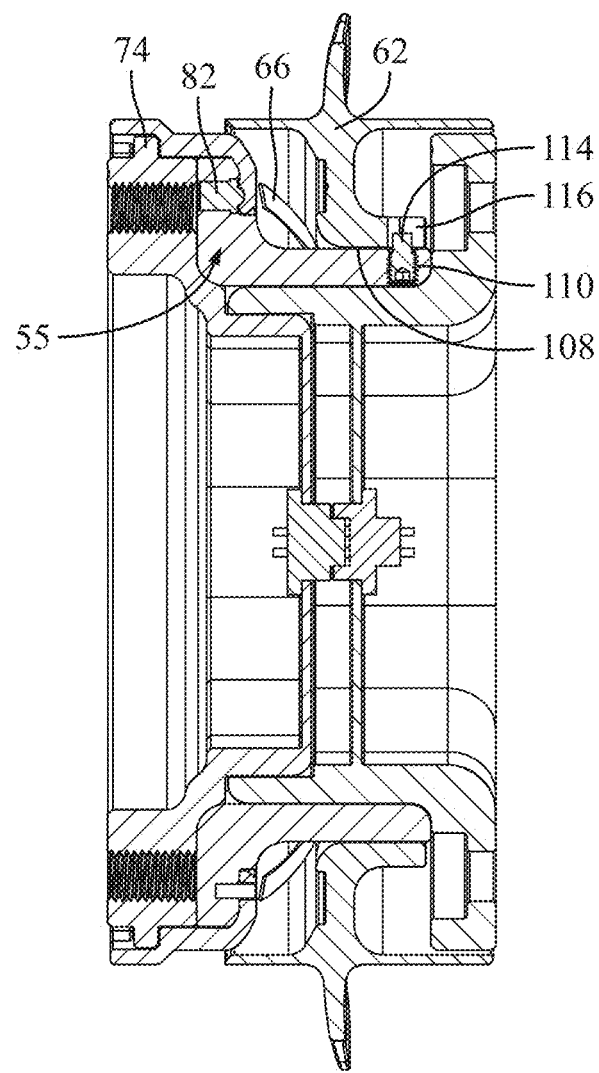
FIG. 10 is a cross sectional view of the fully assembled steering wheel assembly as shown in FIG. 9A, showing counterclockwise rotation of the steering wheel mount lever to release the steering wheel mount.

To disengage the steering wheel mount 14, the user rotates the steering wheel mount lever 70 counterclockwise (see FIGS. 9A and 10). As the lever 70 rotates, the ball detent 82 moves out of recess 90 and aligns with recess 90a, corresponding to the disengaged position. This transition ensures a controlled release of the steering wheel mount 14 from the core 22. The curved slot 120 in the lever 70, along with the pin 122, limits the rotational movement of the lever 70, preventing over-rotation beyond the intended engagement and disengagement positions. An audible noise is made when the detent 82 is snapped into depression 90 or 90a.

Figure 15:
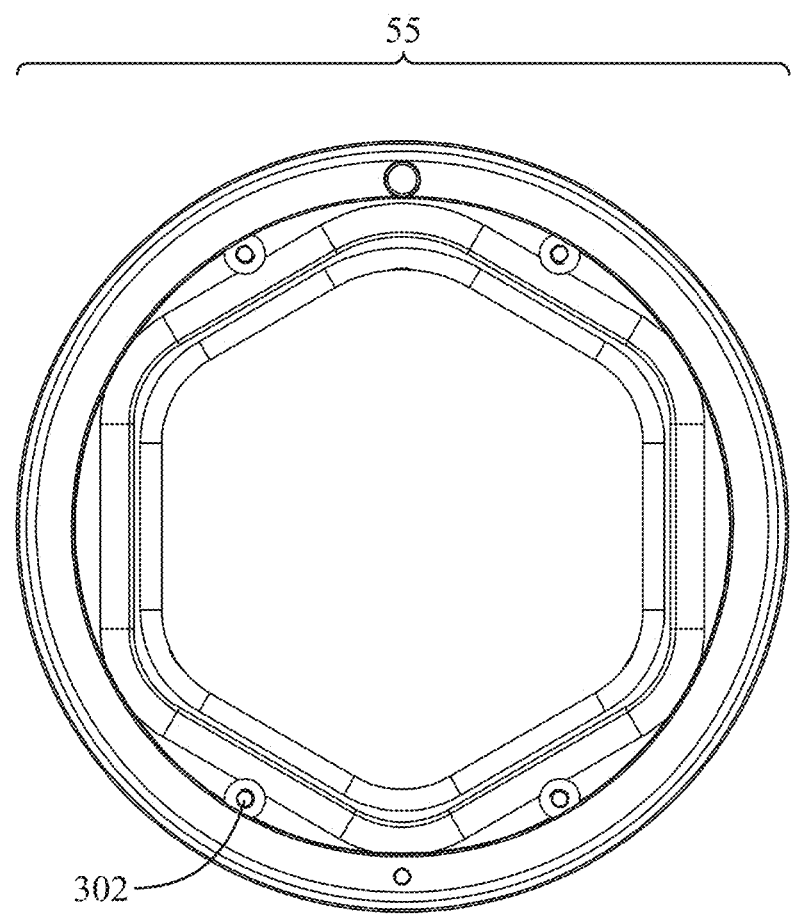
FIG. 15 is a rear view of the body as shown in FIG. 1.
Figure 16:
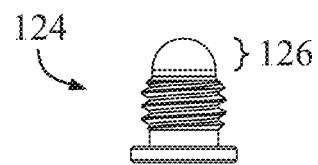
FIG. 16 is a side view of a high-precision locating pin.
Figure 17:
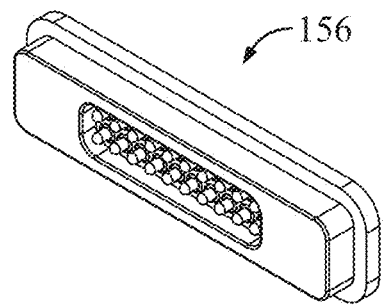
FIG. 17 is a perspective view of electrical contacts attached to the hub mount.
Figure 18:
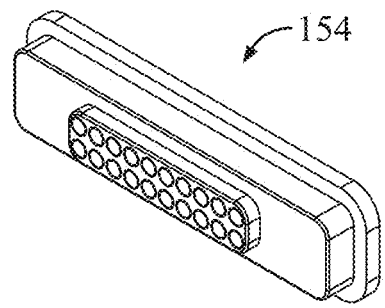
FIG. 18 is a perspective view of electrical contacts attached to the steering wheel mount.
Figure 22:
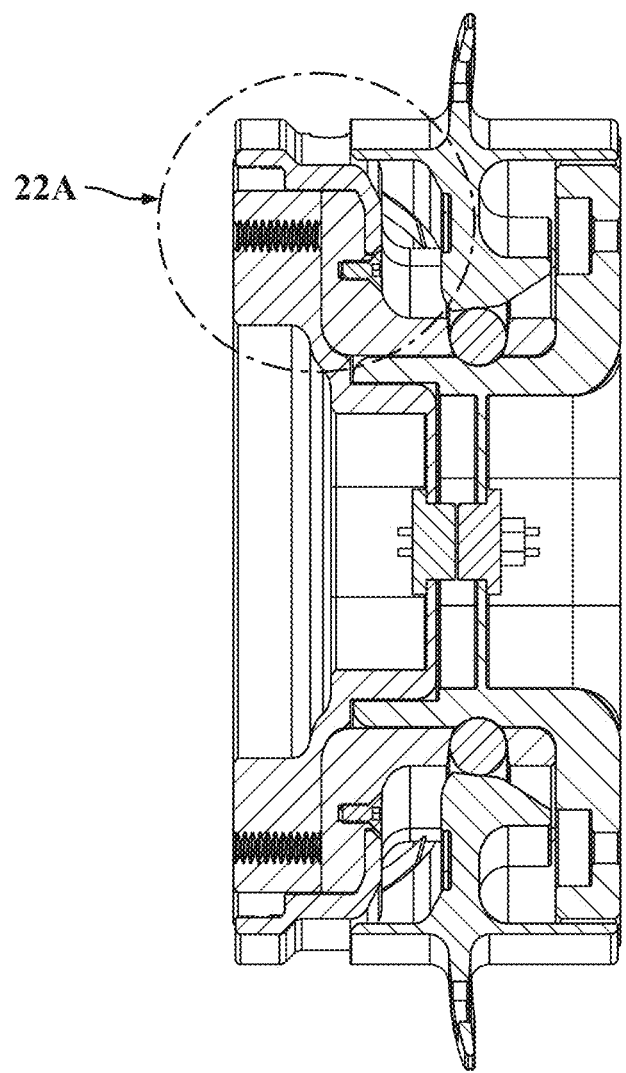
FIG. 22 is a cross sectional view of the steering wheel mount lever and a countersink screw.
Figure 22A:
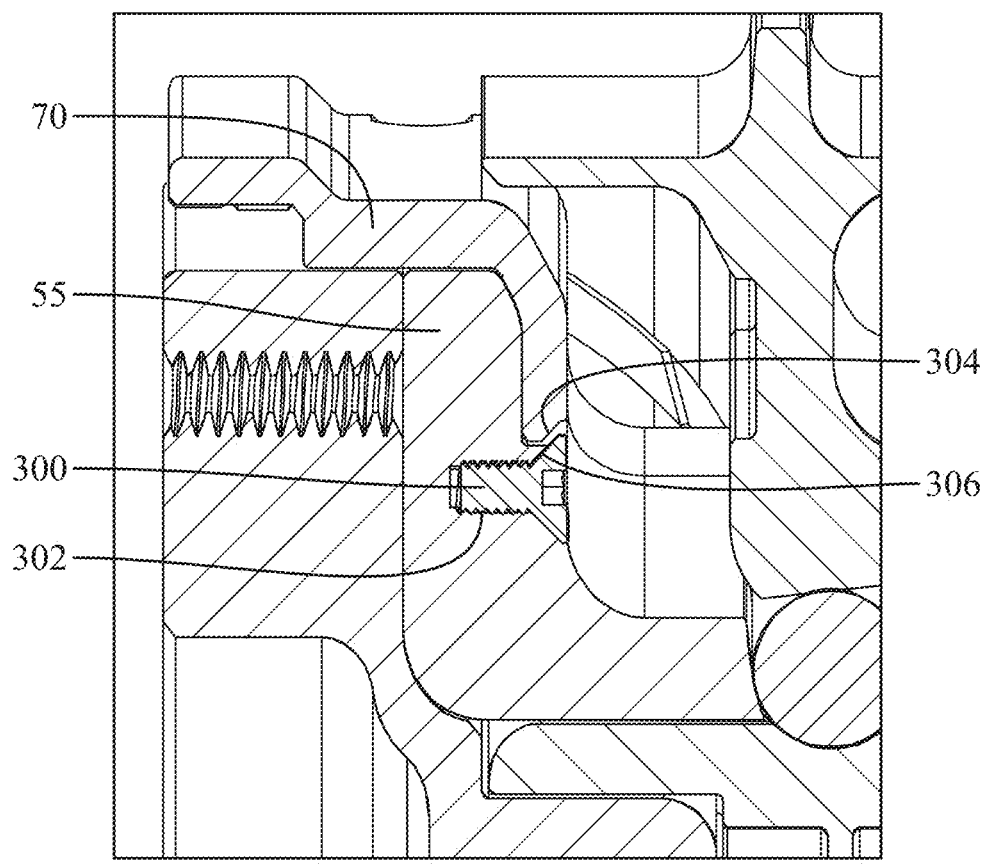
FIG. 22A is an enlarged cross sectional view of the steering wheel mount lever and the countersink screw shown in FIG. 22.

To keep the steering wheel mount lever 70 attached to the body 55, the body 55 may have a plurality of threaded holes 302 (see FIGS. 15 and 20). Countersink screws 300 may be threaded into the threaded holes 302. The steering wheel mount lever 70 has a bevel surface 304 which mates with a bevel surface 306 of a head of the countersink screw 300. (see FIG. 22A) When the core 22 is fully assembled, the steering wheel mount lever 70 cannot be pushed toward the hub mount release lever 62.

Figure 14:
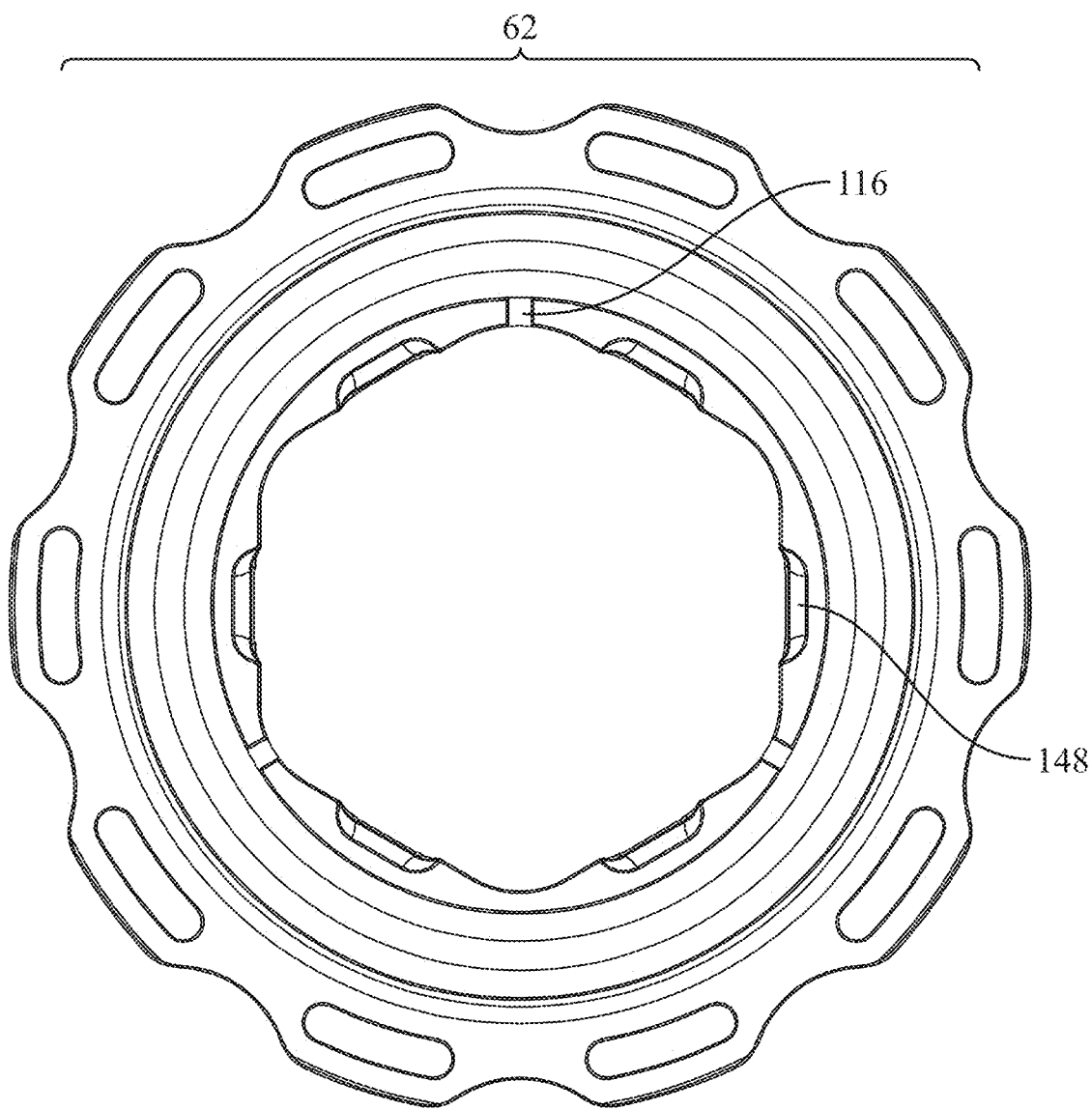
FIG. 14 is a rear view of the hub mount lever as shown in FIG. 1.

The hub mount release lever 62 (see FIGS. 19 and 20) is then positioned onto the body 55, circumscribing the distal end portion 108 (see FIG. 20). FIG. 10 illustrates the spring 66 and the lever 62 stacked onto the distal end portion 108 of the body 55. The lever 62 is responsible for actuating the detent mechanism 42 and is biased to an engaged position (see FIG. 10) by the wave spring 66 (see FIGS. 1, 8 and 10). The outer peripheral flange 118 of the lever 62 provides a gripping surface for the user to pull and disengage the locking mechanism. The hub mount release lever 62 may have indentations 63 (see FIG. 4) distributed 360 degrees around the hub mount release lever 62. The indentations 63 create an organic grip position for the human hand to aid in single hand release and attachment operation. The slots 116 (see FIGS. 10, 14, and 20) in the lever 62 receive the cylindrical end portions 114 (see FIGS. 10 and 20) of limit screws 110, which are threaded into holes 112 (see FIG. 20) in the body 55. These limit screws prevent the lever 62 from coming off the core 22 while allowing it to slide between engaged and disengaged positions (see FIGS. 10 and 11).

The hub mount release lever 62 is secured to the body 55 using limit screws 110, which are inserted into threaded holes 112 in the body 55. Each limit screw 110 has a cylindrical end portion 114 that extends outward and fits into slots 116 formed in the hub mount release lever 62. The slots 116 allow the hub mount release lever 62 to slide axially (see FIGS. 10 and 11) while preventing it from detaching from the body 55. When the user pulls on the outer peripheral flange 118 of the hub mount release lever 62, the cylindrical end portions 114 move out of the slots 116. The lever 62 is in the disengaged position. Once released, the lever 62 returns to the engaged position due to the biasing force of the wave spring 66. The cylindrical end portions 114 ensure that the lever 62 remains securely attached to the body 55 and doesn't fall out.

Figure 8:
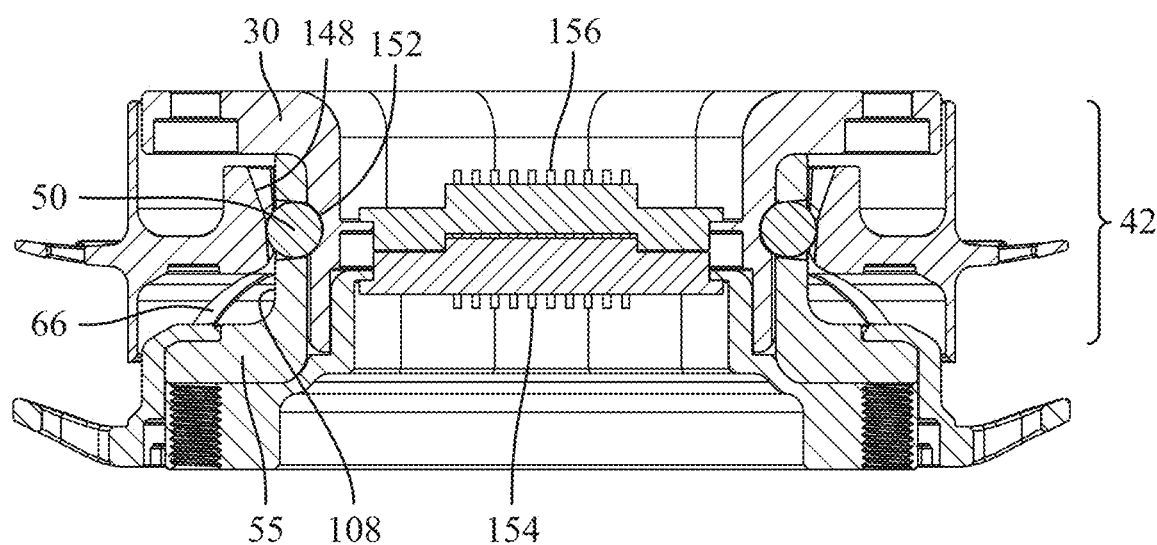
FIG. 8 is a sectional view of the fully assembled steering wheel assembly as shown in FIG. 2 in a second position.

The wave spring 66 is positioned between the hub mount release lever 62 and the rotating steering wheel mount lever 70 (see FIG. 8). This placement allows the wave spring 66 to apply a continuous biasing force, ensuring that both levers return to their engaged positions after being actuated.

Figure 21:
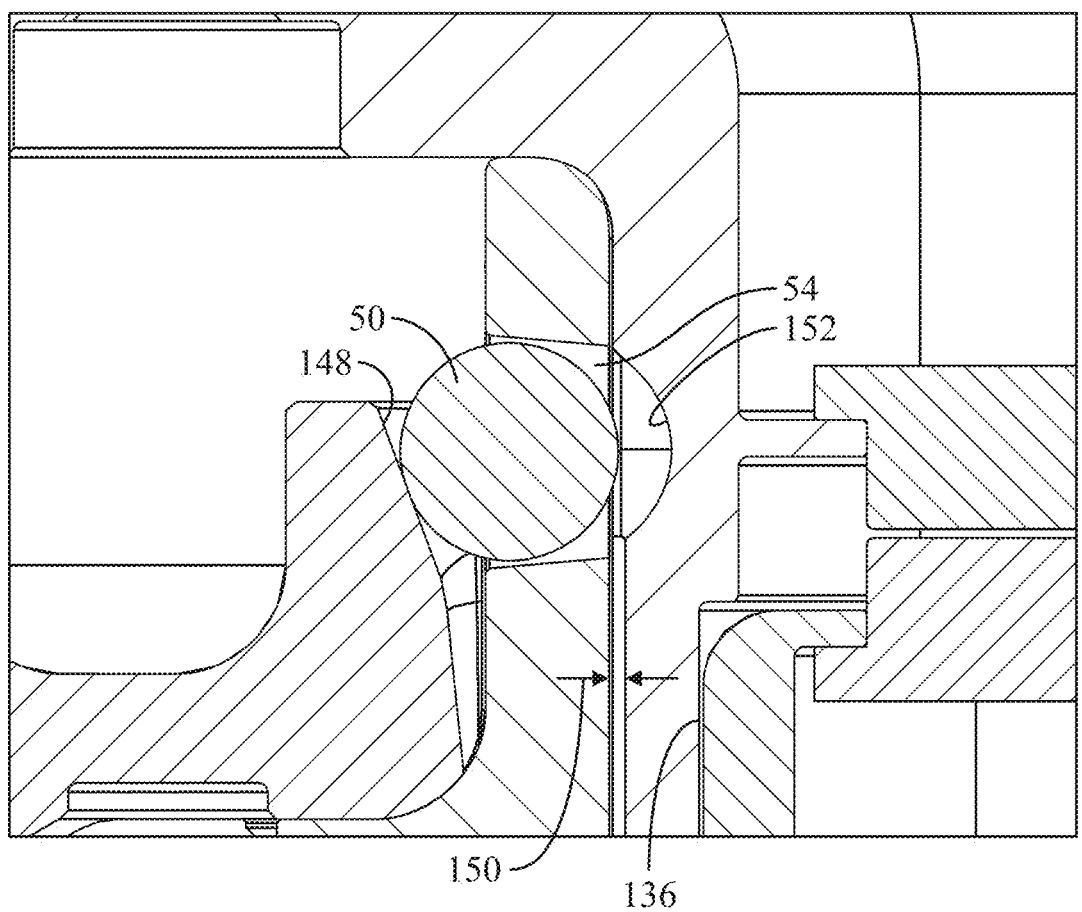
FIG. 21 is an enlarged view showing the disengaged position of the detent mechanism, with the pins retracted and the core ready for removal from the hub mount.

When the hub mount release lever 62 is pulled, the wave spring 66 compresses slightly, allowing the pins 50 of the detent mechanism 42 to retract into recesses 54 (see FIG. 21). Once the user releases the lever 62, the stored energy in the wave spring 66 pushes the lever 62 back to its original engaged position, ensuring that the pin 50 is disposed back into the recess 152 (see FIG. 8). The detent mechanism 42 remains locked during normal operation. When the steering wheel mount lever 70 is rotated counterclockwise to disengage the steering wheel mount 14, the wave spring 66 provides sliding frictional resistance. This resistance ensures that the lever 70 does not rotate freely and helps maintain a stable connection between the steering wheel mount 14 and the core 22.

Pins 50 of the detent mechanism 42 are inserted into recesses 54 in the body 55 of the core 22 (see FIGS. 1, 7, 8 and 21). The recesses 54 have a narrowing configuration, preventing the pins 50 from being pushed all the way through during assembly when the hub mount 30 is not attached. The hub mount release lever 62 interacts with these pins 50, allowing them 50 to be pulled back into the recesses 54 when the user pulls on the lever 62 (see FIGS. 7 and 21). Pulling the hub mount release lever 62 overcomes the spring force of the spring 66 to traverse the hub mount release lever 62 to the disengaged position. The spring 66 biases the lever 62 to the engaged position, ensuring the pins 50 are automatically engaged and pushed into the depression 152 of the hub mount 30 (see FIGS. 7, 8, and 21).

Figure 7:
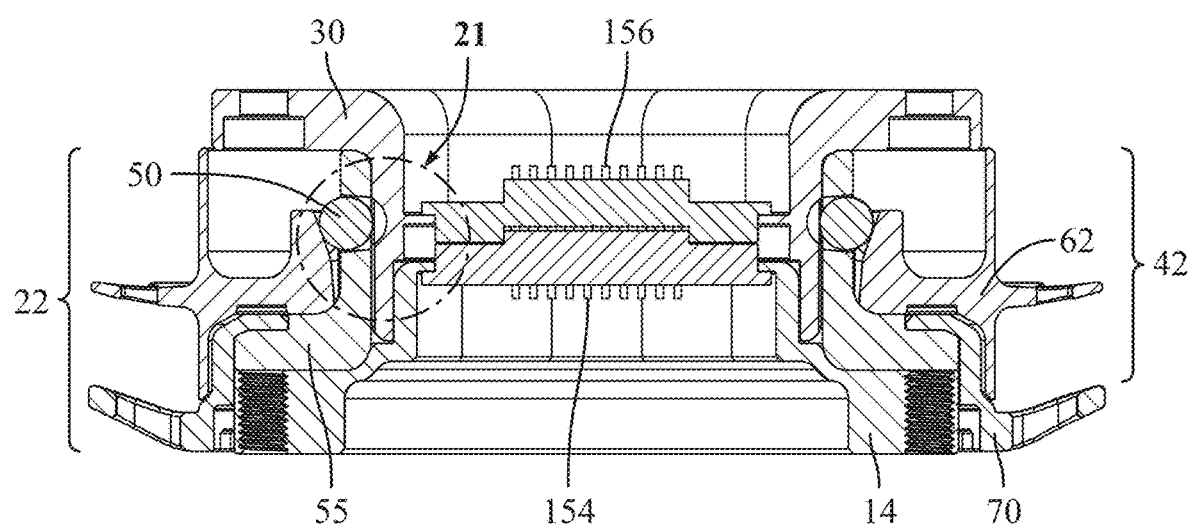
FIG. 7 is a sectional view of the fully assembled steering wheel assembly as shown in FIG. 2 in a first position.

During attachment, as the core 22 is positioned onto the hub mount 30, the pins 50 of the detent mechanism 42 are initially retracted into recesses 54 in the body 55 (see FIGS. 7 and 21). The recesses 54 have a narrowing configuration, ensuring that the pins 50 cannot pass entirely through. As the core 22 is fully seated onto the hub mount 30 and the hub mount release lever 62 is released, the spring 66 pushes the hub mount release lever 62 to the engaged position. The ramp 148 pushes the pins 50 inward, causing them 50 to engage with the depression 152 of the hub mount 30. This engagement locks the core 22 onto the hub mount 30, preventing unintended separation.

During removal, when the user pulls the hub mount release lever 62 in the pull direction 146, the pins 50 retract into the recesses 54, disengaging from the depression 152 of the hub mount 30 (see FIGS. 5, 14, 20, and 21). The ramp surface 148 gradually allows the pins 50 to be pulled out of the depression 152 (see FIGS. 7 and 21) during this transition, ensuring smooth disengagement. The user can then separate the core 22 from the hub mount 30 without interference from the pins 50.

Once assembled, the core 22 functions as an first removable attachment point for the steering wheel mount 14 and the steering wheel. The rotating steering wheel mount lever 70 provides a secure locking mechanism for the steering wheel mount 14 (see FIGS. 4, 9A, 9B, 10 and 11), while the hub mount release lever 62 and detent mechanism 42 allow the core 22 to be quickly attached or removed from the hub mount 30 (see FIGS. 7, 8, and 21). These components work together to create a system that is both secure during use and easy to operate for quick steering wheel changes.

To attach the core 22 to the hub mount 30, the user aligns the core 22 with the hub mount 30 and engages the pull-activated detent mechanism 42. The hub mount 30 is fixed to the hub 34, which is secured to the steering column 38 (see FIG. 1). The detent mechanism 42 ensures that the core 22 remains securely attached to the hub mount 30 during use while allowing for quick removal when necessary.

Figure 6:
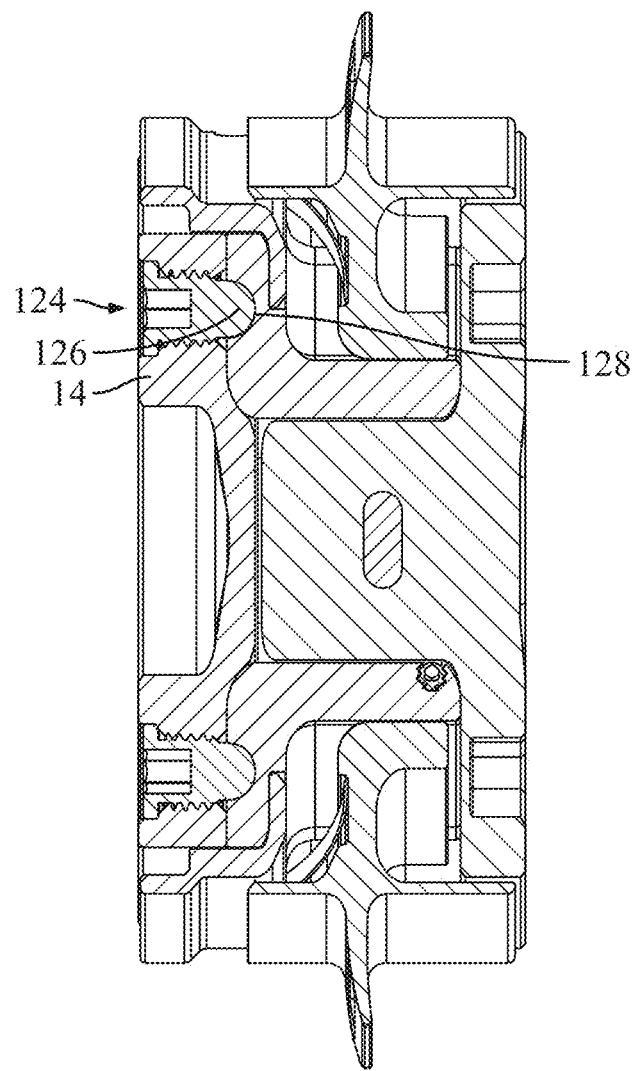
FIG. 6 is a cross sectional view of the fully assembled steering wheel assembly as shown in FIG. 9B.

With respect to the steering wheel mount 14 and the core 22, high-precision locating pins 124 are installed on the steering wheel mount 14 to ensure accurate alignment with the core 22 during attachment (see FIG. 6). Each locating pin 124 includes a distal end portion 126, which interacts with bulbous depressions 128 formed in the body 55 of the core 22. The engagement of the distal end portion 126 with the bulbous depressions 128 (see FIGS. 6 and 19) prevents lateral and rotational movement of the steering wheel mount 14 relative to the core 22, ensuring stability during use.

As the user rotates the steering wheel mount lever 70 in the clockwise direction 144 (see FIG. 9B), the ramp 138 (see FIG. 12) on the first thread 74 engages the second thread 78 (see FIGS. 9A and 9B) applies a downward force on the distal end portion 126 (see FIG. 6) of the locating pins 124. This force guides the pins 124 into the bulbous depressions 128, ensuring they are fully seated. The engagement between the locating pins 124 and the depressions 128 maintains precise alignment and prevents unintentional shifting of the steering wheel mount 14 during operation of the steering wheel 20. The body 55 of the core 22 includes a through hole 134, which extends entirely through its structure. The through hole 134 (see FIGS. 4 and 19) is sized and configured to align with the external distal end portion 102 (see FIG. 12) of the steering wheel mount 14 when attached.

The attachment process begins by pulling the hub mount release lever 62 (see FIGS. 3 and 5) in the pull direction 146 (see FIG. 3) to retract the pins 50 of the detent mechanism 42 into the recesses 54 of the body 55 of the core 22 (see FIGS. 7 and 21). This allows the core 22 to be positioned onto the hub mount 30 without interference from the pins 50.

The user then aligns the internal distal end portion 106 (see FIG. 5) of the core 22 with the proximal end portion 200 (see FIGS. 4 and 5) of the hub mount 30. The external proximal end portion 200 is configured to guide the core 22 into the proper position, ensuring correct alignment before engagement. The internal distal end portion 106 and the external proximal end portion 200 have a matching polygonal shape that prevents incorrect orientation (see FIGS. 15, 19, 20 and 21). The polygonal shape is asymmetrical to allow the two parts 106, 200 to engage each other in only one angular orientation so that the steering wheel 20 is properly aligned to the steering column.

The hub mount 30 features an external proximal end portion 200, which is disposed at the interface between the hub mount 30 and the core 22. The external proximal end portion 200 is shaped to match the internal distal end portion 106 of the core 22, ensuring a secure and properly aligned connection. This external proximal end portion 200 also contributes to the engagement of the detent mechanism 42, helping guide the core 22 into place while preventing lateral and rotational movement when attached.

Once the core 22 is fully inserted onto the hub mount 30, the user releases the hub mount release lever 62, allowing the spring 66 (see FIGS. 1 and 8) to push the lever 62 back to its engaged position. As this occurs, the pins 50 of the detent mechanism 42 begin to move inward. The ramp surface 148 (see FIGS. 14, 20, and 21) plays a crucial role in guiding the pins 50 into position. As the lever 62 is released, the force from the spring 66 pushes the pins 50 inward, and the ramp surface 148 gradually redirects the movement of the pins 50 toward the depression 152 of the hub mount 30 (see FIGS. 8 and 21). The interaction between the ramp surface 148 and the pins 50 ensures that the pins 50 smoothly transition from the retracted position within recesses 54 to the fully engaged position within the depression 152 of the hub mount 30.

Once the pins 50 are fully seated in the depression 152, the core 22 is securely locked onto the hub mount 30, creating a stable connection between the steering wheel 20 and the steering column 38 (see FIG. 1). The detent mechanism 42, biased by the spring 66, ensures that the core 22 remains engaged until the user intentionally pulls the hub mount release lever 62 to retract the pins 50 for removal.

The system is designed so that pin 50 does not necessarily retract fully into recess 54 but remains slightly protruded by a distance 150 (see FIG. 21). This slight protrusion ensures that when the core 22 is removed, pin 50 is already partially extended, allowing for quick engagement with depression 152 upon reattachment to hub mount 30. However, in some configurations, pin 50 may be fully retracted into recess 54 before removal. This variation accommodates different tolerance requirements for precise operation. The interaction between ramp surface 148 and pin 50 ensures that pin 50 smoothly transitions from a partially retracted state to full engagement.

To attach the steering wheel mount 14 to the core 22, the user utilizes the rotating lock mechanism 26 (see FIG. 1), which provides a secure yet easily releasable connection. The steering wheel mount 14 is affixed to the central portion 18 of the steering wheel 20 (see FIG. 23) and is designed to engage with the core 22 in only one orientation. This ensures proper alignment between the steering wheel 20 and the steering column 38 (see FIGS. 1 and 12).

The attachment process begins by aligning the external distal end portion 102 of the steering wheel mount 14 with the recess proximal end portion 106 of the core 22 (see FIG. 9A). The external distal end portion 102 has an asymmetric polygonal shape, which corresponds to the recess proximal end portion 106 (see FIG. 4) of the core 22, preventing improper angular orientation. This alignment ensures that the steering wheel 20 is positioned correctly relative to the vehicle or gaming setup.

Once aligned, the user inserts the external distal end portion 102 of the steering wheel mount 14 into the recess proximal end portion 106 of the core 22. The first thread 74 on the steering wheel mount 14 is then aligned with gaps 132 in the rotating steering wheel mount lever 70 (see FIG. 9A). At this stage, the steering wheel mount lever 70 is in the disengaged position, allowing the first thread 74 to pass through the gaps 132 (see FIG. 9A).

Figure 9B:
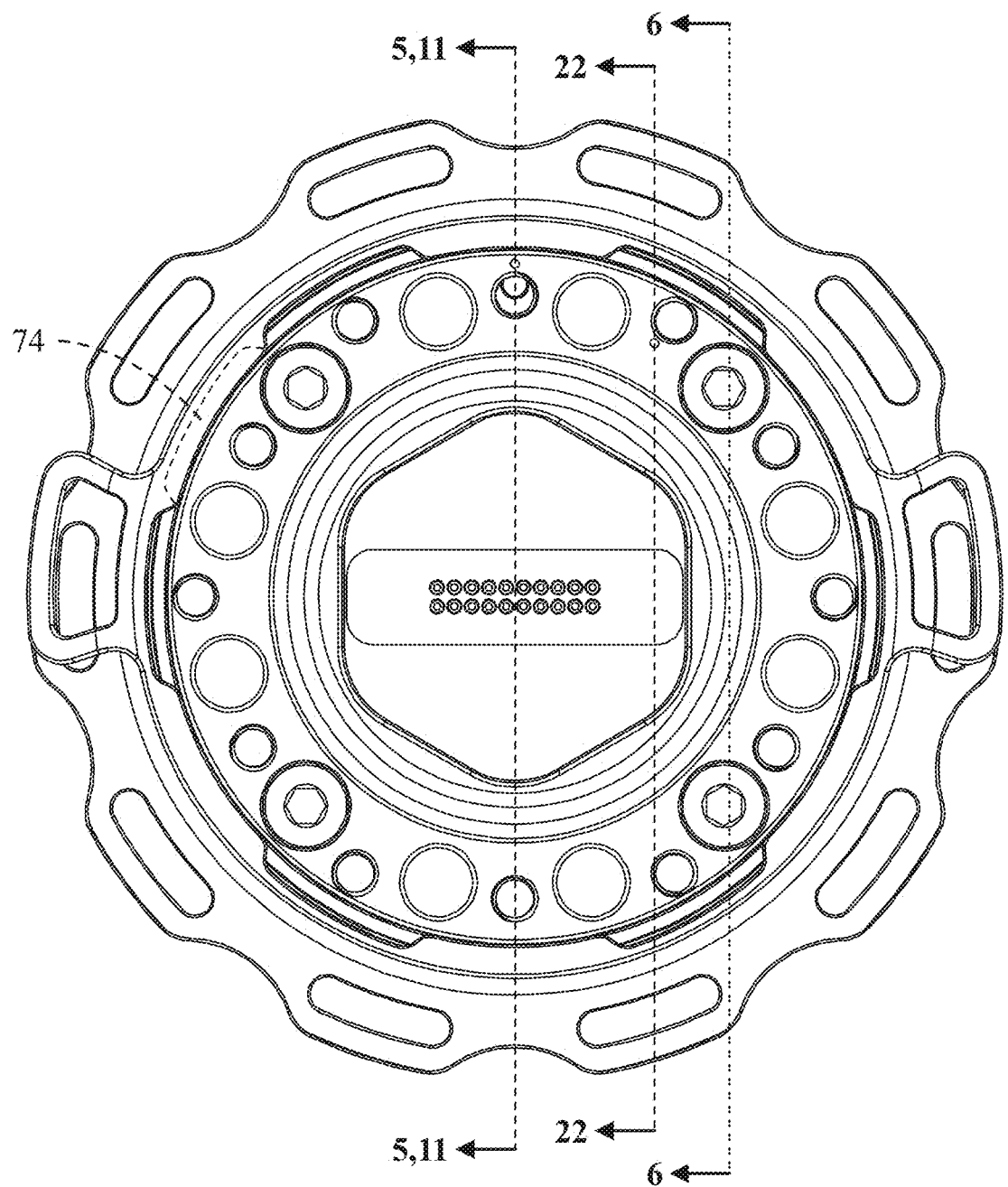
FIG. 9B is a front view of the fully assembled steering wheel assembly as shown in FIG. 9A but illustrating the engaged position of the steering wheel mount lever, securing the steering wheel mount to the core.
Figure 11:
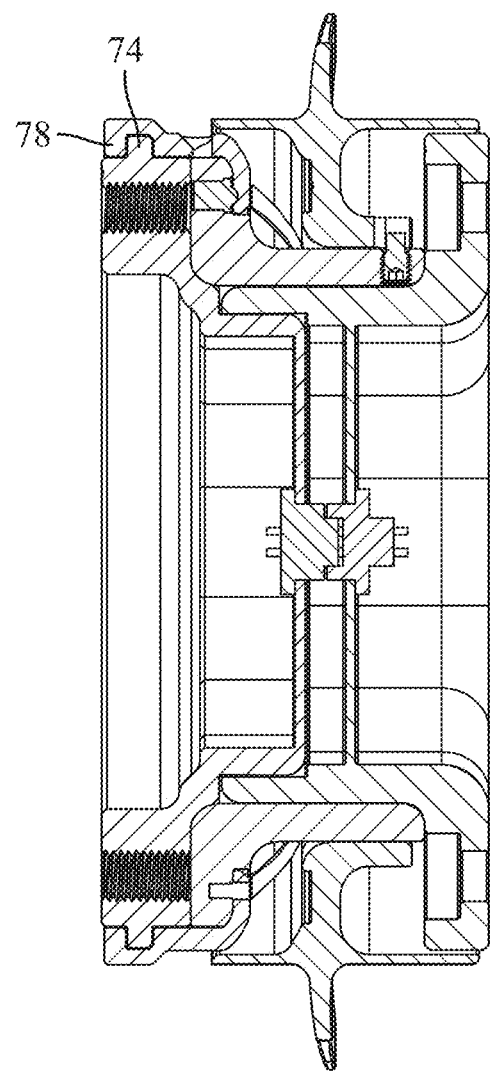
FIG. 11 is a cross sectional view of the fully assembled steering wheel assembly as shown in FIG. 9B, showing. clockwise rotation of the steering wheel mount lever to engage the steering wheel mount.

After the first thread 74 is positioned within the gaps 132, the user rotates the steering wheel mount lever 70 in the clockwise direction 144 (see FIGS. 9B and 11). This action engages the second thread 78 on the steering wheel mount lever 70 with the first thread 74 on the steering wheel mount 14 (see FIGS. 4 and 13). As the lever 70 is rotated, the second thread 78 moves along the first thread 74, drawing the steering wheel mount 14 into a fully seated position against the core 22.

As the second thread 78 moves along the first thread 74, the ramp surface 138 (see FIG. 12) on the first thread 74 applies a downward force on the distal end portion 126 of high-precision locating pins 124. This force guides the distal end portion 126 into bulbous depressions 128 formed in the body 55 of the core 22 (see FIG. 6). As the lever 70 continues to rotate, the ramp 138 ensures that the distal end portion 126 is fully seated within the bulbous depressions 128, providing precise positioning of the steering wheel mount 14 relative to the core 22. This engagement enhances stability and prevents unwanted movement of the steering wheel 20 during use.

The first thread 74 of the steering wheel mount 14 includes a top surface 140, which interacts with the second thread 78 of the steering wheel mount lever 70 when engaged. As the steering wheel mount lever 70 rotates in the clockwise direction 144, the second thread 78 moves along the ramp 138 of the first thread 74. Once fully engaged, the second thread 78 presses against the top surface 140 of the first thread 74, ensuring a secure locking position. This surface contact provides mechanical stability and prevents unintended loosening of the connection during operation.

Figure 13:
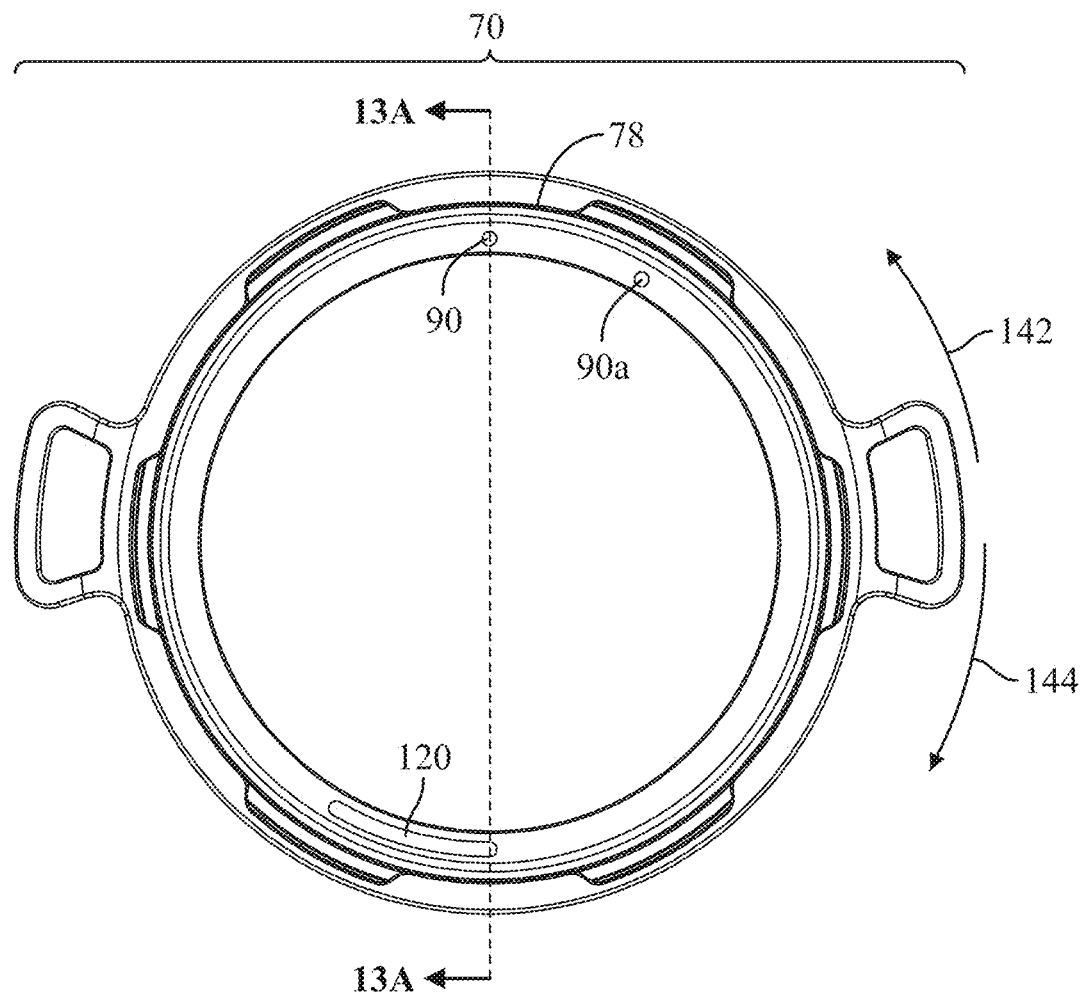
FIG. 13 is a front view of the steering wheel mount lever as shown in FIG. 1.
Figure 13A:
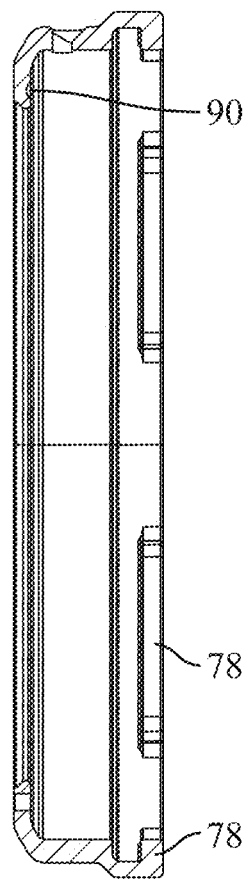
FIG. 13A is a side cross sectional view of the steering wheel mount lever shown in FIG. 13.

To further secure the connection, the spring-loaded ball detent 82 (see FIGS. 1, 5, 10 and 11) engages with a recess 90 in the steering wheel mount lever 70 (see FIGS. 13 and 13A). When the detent 82 locks into place, it provides audible feedback, confirming that the steering wheel mount 14 is fully in the engaged or disengaged position to the core 22. The detent 82 prevents unintended rotation of the steering wheel mount lever 70 during use, keeping the connection secure.

To facilitate electrical communication between steering wheel 20 and the vehicle's or gaming setup's electrical system, steering wheel mount 14 is provided with a first set 154 of electrical contacts, while hub mount 30 includes a second set 156 of electrical contacts (see FIG. 8). When steering wheel mount 14 is locked to core 22 and core 22 is engaged with hub mount 30, the first set 154 of electrical contacts aligns and contacts with the second set 156, enabling signal transmission between the steering wheel 20 and the vehicle's or gaming setup's onboard electronics. These contacts may transfer power, button signals, or force feedback commands depending on the application. The engagement of the rotating lock mechanism 26 ensures that electrical contacts 154 and 156 remain aligned during use, preventing intermittent connection issues. The electrical contacts 154, 156 retain full electrical functionality of both vehicle and gaming steering wheel-mounted controls. Typical pin count is two for horn button functionality. The electrical contacts 154, 156 facilitates swapping steering wheels, as all wiring is contained within the steering wheel 20 and the steering wheel mount 14. As a result, the user retains full electrical functionality without needing to reconnect wires to ensure the horn or other steering mounted controls function as intended.

Once the steering wheel mount 14 is attached, the steering wheel 20 is firmly secured to the core 22, allowing the driver to control the vehicle or gaming setup with confidence. The attachment process is designed to be quick and efficient while ensuring a reliable mechanical connection.

Figure 4:
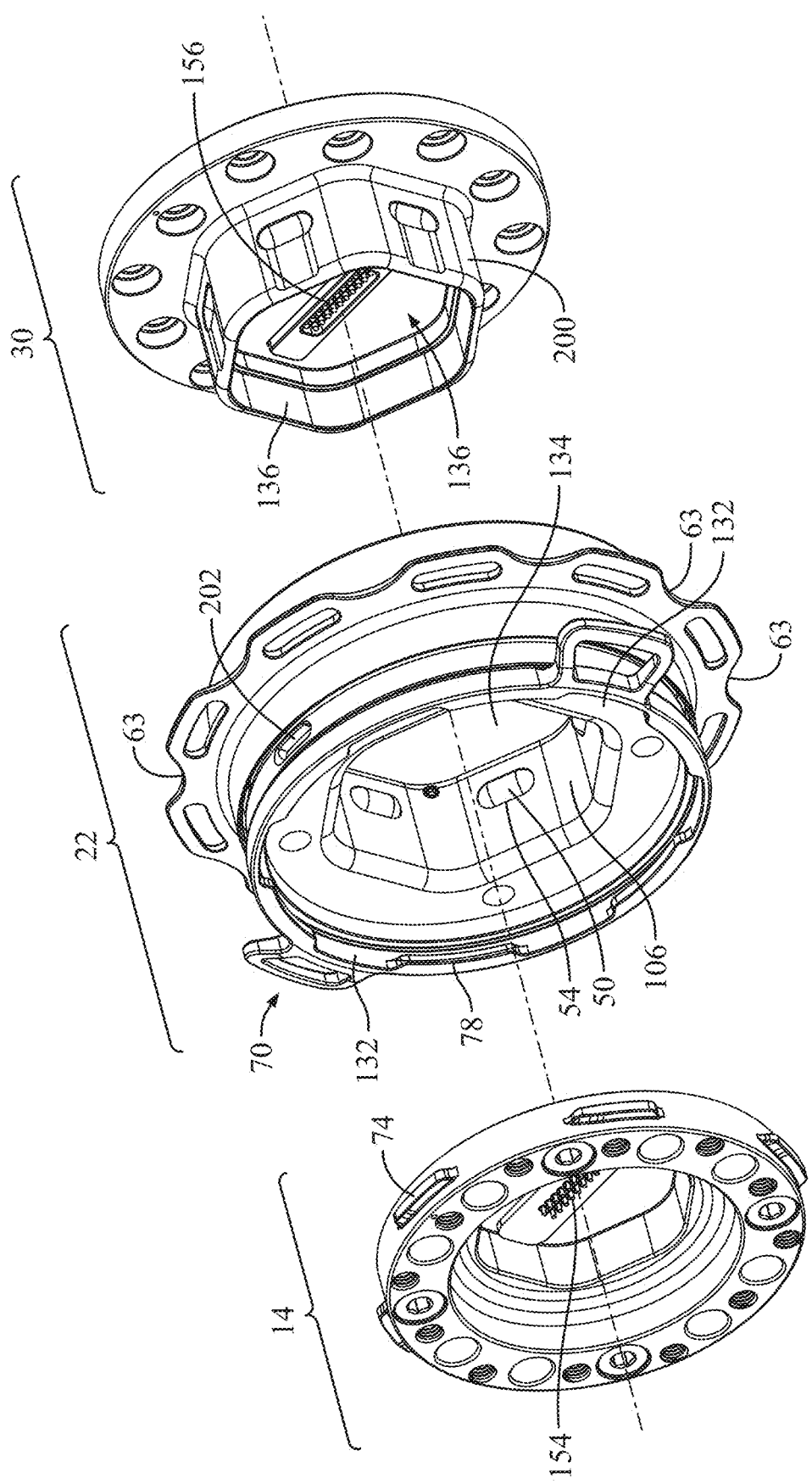
FIG. 4 is an exploded perspective view of the steering wheel mount of the steering wheel assembly, core, and hub mount.
Figure 5:
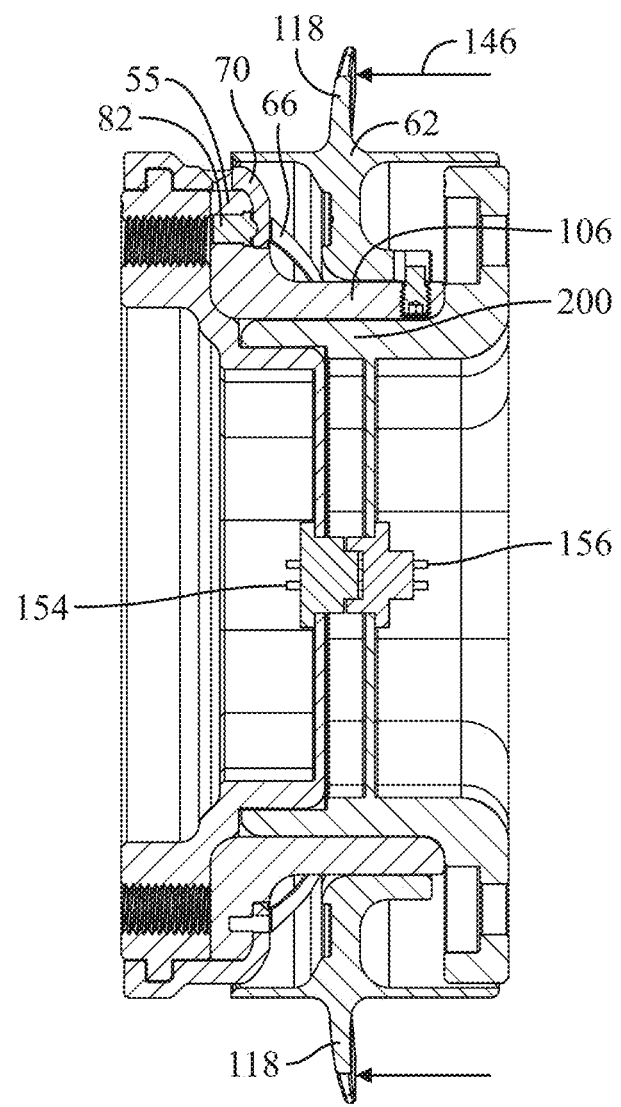
FIG. 5 is a cross sectional view of the fully assembled steering wheel assembly as shown in FIG. 9B.

To detach the steering wheel mount 14, with the steering wheel 20 attached thereto, from the core 22, the user must disengage the audible rotating lock mechanism 26 (see FIGS. 1, 4, and 9A). This mechanism securely fastens the steering wheel mount 14 to the core 22 while allowing for quick removal when needed.

The removal process begins by rotating the steering wheel mount lever 70 in the counterclockwise direction 142 (see FIGS. 9A and 10). As the lever 70 rotates, the second thread 78 on the steering wheel mount lever 70 disengages from the first thread 74 on the steering wheel mount 14 (see FIGS. 9A and 10). This action releases the clamping force that holds the steering wheel mount 14 securely against the core 22.

As the second thread 78 disengages from the first thread 74, the spring-loaded ball detent 82 (see FIGS. 1, 4, and 20) moves out of the recess 90 of the steering wheel mount lever 70 to the recess 90a (see FIGS. 13 and 13A). This provides audible feedback to the user, indicating that the steering wheel mount lever 70 is in the disengaged position and the steering wheel mount 14 is ready for removal.

Once the steering wheel mount lever 70 is fully rotated to the disengaged position, the first thread 74 aligns with the gaps 132 in the steering wheel mount lever 70 (see FIGS. 4, 9A, and 9B). At this point, the user can pull the steering wheel 20 and the attached steering wheel mount 14 away from the core 22.

The external distal end portion 102 of the steering wheel mount 14 is then withdrawn from the recess proximal end portion 106 of the core 22 (see FIGS. 4 and 21). Because the external distal end portion 102 and the recess proximal end portion 106 have a matching asymmetric polygonal shape (see FIGS. 19 and 20), the steering wheel mount 14 can only be removed in the correct orientation.

Once detached, the steering wheel mount 14 and steering wheel 20 can be stored separately, attached to a different core 22, or mounted onto a wall-mounted docking station 94 (see FIGS. 7 and 23) for convenient storage. The wall-mounted docking station 94 does not have a rotatable steering wheel mount lever. Instead, it 94 features the same threads 78 and gaps 132 as steering wheel mount lever 70. To secure the steering wheel, it is first attached in a 30° clockwise position and then rotated 30° counterclockwise to lock into the docking station 94. The wall-mounted docking station features a similar spring loaded ball featured in audible rotating lock mechanism 26 ensures that the removal process is quick, secure, and easy to perform without requiring additional tools.

Figure 2:
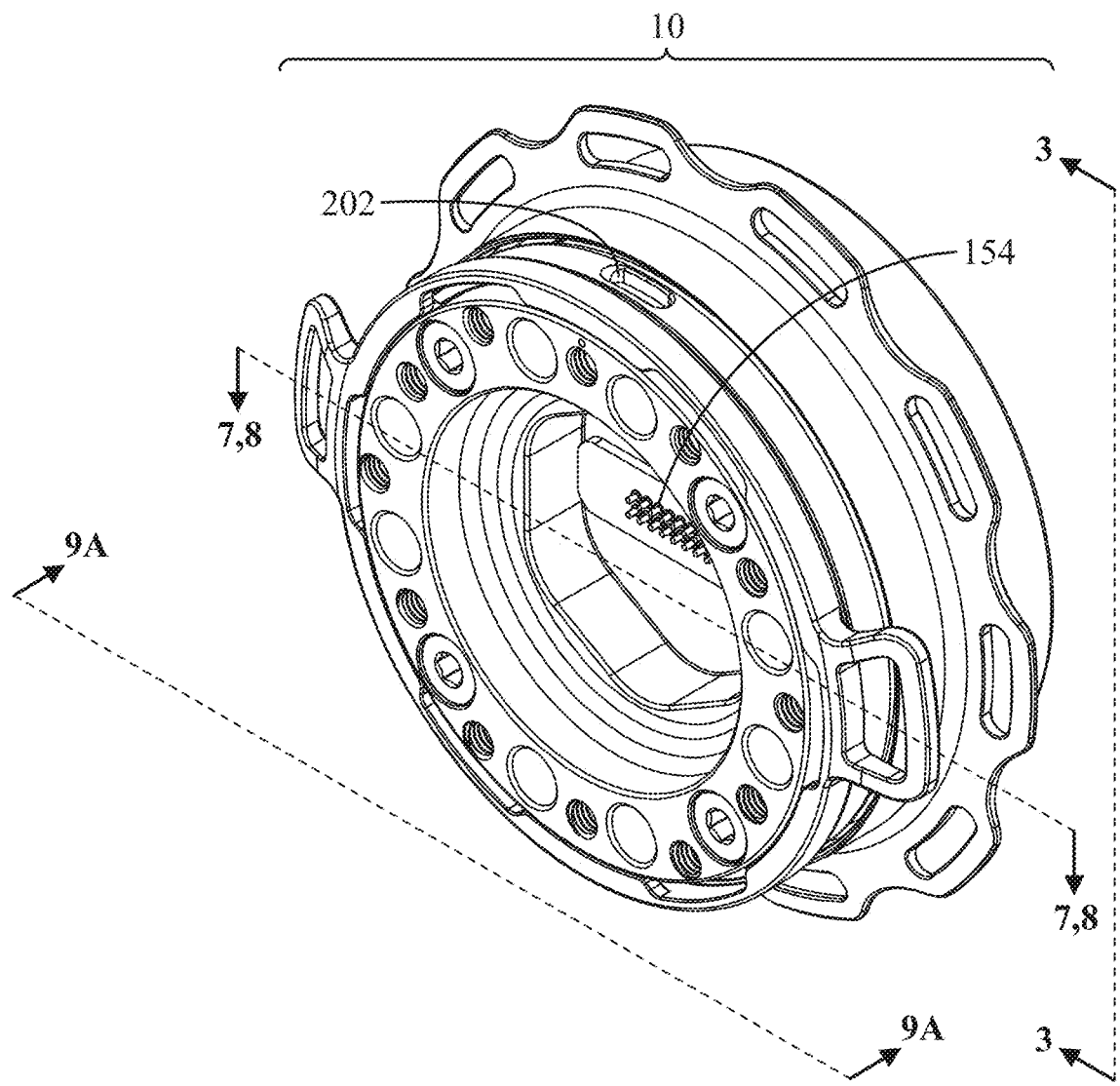
FIG. 2 is a perspective view of the fully assembled steering wheel assembly, with the steering wheel mount and hub mount mounted to the core.

In an aspect, the steering wheel mount lever 70 may have a status window 202 (see FIG. 2). The body 55 may have indicia printed thereon which is aligned to and shown through the status window 202 when the steering wheel mount lever 70 is in the locked position or the unlocked position. The indicia may be LOCKED or UNLOCKED. This provides the user with a visual indication as to the status of the steering wheel mount lever 70.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A steering wheel assembly comprising:
   a steering wheel mount attached to a central portion of a steering wheel;
   a core configured to be removably attachable to the steering wheel mount via a rotating lock mechanism;
   a hub mount attachable to a hub, wherein the hub is attached to either a vehicle steering column or a simulation-based steering system, the core being configured to be removably attachable to the hub mount via a pull-activated detent mechanism which is biased to an engaged position by a spring.

2. The steering wheel assembly of claim 1 wherein the steering wheel mount has a first set of electrical contacts and the hub mount has a second set of electrical contacts,
   wherein the first and second sets of electrical contacts establish electrical communication when the steering wheel mount and hub mount are attached to the core;
   wherein the first and second sets of electrical contacts are configured as direct-contact conductive surfaces or spring-loaded pins;
   wherein the electrical contacts are mechanically and/or magnetically aligned to ensure reliable connectivity and prevent misalignment during engagement and disengagement.

3. The steering wheel assembly of claim 1, wherein the detent mechanism comprises a pin that is slidable within a recess in a body of the core, the pin being traversable between an engaged position to retain the hub mount to the core and a disengaged position to permit removal of the hub mount from the core.

4. The steering wheel assembly of claim 1, wherein a hub mount release lever is traversable between a normally biased engaged position and a disengaged position, wherein:
   in the engaged position, a pin is also in the engaged position, and the hub mount cannot be removed from the core;
   in the disengaged position, a pin is allowed to be traversed to the disengaged position to permit removal of the hub mount from the core;
   wherein the hub mount release lever is biased by a spring to automatically return to the engaged position upon release, securing the pin in place and re-engaging the hub mount to the core;
   wherein, in the engaged position, the hub mount release lever is configured to conceal at least a majority of a hub mount flange when viewed radially, such that the hub mount flange is not predominantly visible, preventing exposure of the hub mount flange.

5. The steering wheel assembly of claim 4 wherein the hub mount release lever has a plurality of indentations,
   wherein the indentations are ergonomically positioned to provide tactile feedback for a user's fingers,
   wherein the indentations are shaped and positioned to enhance grip for single-hand operation,
   wherein the indentations assist in precise control when actuating the hub mount release lever to transition between the engaged and disengaged positions.

6. The steering wheel assembly of claim 1, wherein the spring in the detent mechanism is a wave spring configured to provide biasing force so that a hub mount release lever is biased to the engaged position,
   wherein the wave spring being disposed between the hub mount release lever and a rotating steering wheel mount lever;
   wherein the biasing force is provided by a wave spring or an equivalent biasing element, including but not limited to a coil spring, Belleville washer, or elastomeric compression component.

7. The steering wheel assembly of claim 1, wherein the rotating lock mechanism comprises:
   a steering wheel mount lever and the steering wheel mount, a first thread being disposed on the steering wheel mount;
   a second thread being disposed on the steering wheel mount lever;
   wherein the second thread of the steering wheel mount lever is engagable with the first thread by rotating the steering wheel mount lever in a first direction to retain the steering wheel to the core;
   wherein the second thread of the steering wheel mount lever is disengagable from the first thread by rotating the steering wheel mount lever in a second, opposite direction to remove the steering wheel mount from the core;
   wherein a rotation-limiting mechanism disposed within a body of the core restricts over-rotation of the steering wheel mount lever beyond a predetermined range.

8. The steering wheel assembly of claim 7 wherein the steering wheel mount lever has a status window or other visual indicator that displays a first indication when the steering wheel mount lever is in an unlocked position and a second indication when the steering wheel mount lever is in a locked position.

9. The steering wheel assembly of claim 7, further comprising a detent mechanism disposed on a portion of the core and a corresponding recess formed on the steering wheel mount lever, wherein:
   the detent mechanism is configured to secure the steering wheel mount lever in at least one of a locked position preventing unintended disengagement or an unlocked position allowing removal;

the detent mechanism provides distinct engagement feedback indicating whether the steering wheel mount lever is in the locked or unlocked position.

10. The steering wheel assembly of claim 9 wherein the detent mechanism comprises a spring-biased retention mechanism, including at least one of a spring-loaded ball detent or a spring-loaded pin detent, wherein the detent mechanism is received in the recess when the steering wheel mount lever is in a locked position to prevent unintended disengagement or in an unlocked position to facilitate proper alignment of the steering wheel mount with the core.

11. The steering wheel assembly of claim 1 wherein:
the steering wheel mount includes a plurality of protrusions, and the core includes a plurality of mating depressions;
the protrusions and depressions interlock when the steering wheel mount is attached to the core, ensuring precise alignment;
the interlocking engagement of the protrusions and depressions restricts at least one of: rotational displacement, radial displacement, or axial displacement of the steering wheel mount relative to the core.

12. The steering wheel assembly of claim 1, wherein:
the steering wheel mount includes an external distal end portion configured to mate with a recess proximal end portion of the hub mount, ensuring proper orientation when attaching the steering wheel mount to the core;
the external distal end portion and the recess proximal end portion each have a polygonal configuration;
the polygonal configuration is defined as any closed shape with three or more sides, including but not limited to triangles, quadrilaterals, pentagons, hexagons, or other multi-sided geometries;
the engagement of the external distal end portion of the steering wheel mount and the recess proximal end portion of the hub mount restricts unintended rotation;
the mating configuration enables attachment in at least one predetermined orientation.

13. The steering wheel assembly of claim 12, wherein:
the polygonal shape is selected from a group consisting of a triangle, square, pentagon, hexagon, octagon, dodecagon, multi-lobed, or irregular polygonal configurations; and
the polygonal engagement prevents unintended rotation by providing multiple interlocking points of contact between the external distal end portion of the steering wheel mount and the recess proximal end portion of the hub mount.

14. The steering wheel assembly of claim 3, wherein the polygonal configuration is asymmetrically skewed such that the external distal end portion of the steering wheel mount can only be inserted into the recess proximal end portion of the hub mount in a single correct orientation,
wherein the asymmetrical polygonal engagement ensures proper alignment of the steering wheel mount with the core,
wherein the asymmetry prevents incorrect installation by limiting rotational alignment to one predetermined position.

15. The steering wheel assembly of claim 1, wherein the rotating lock mechanism is configured to produce at least one of:
an audible confirmation when a steering wheel mount lever is rotated in a first direction to retain the steering wheel mount to the core;
a tactile confirmation when the steering wheel mount lever is rotated in the first direction to retain the steering wheel mount to the core;
an audible confirmation when the steering wheel mount lever is rotated in a second, opposite direction to remove the steering wheel mount from the core;
a tactile confirmation when the steering wheel mount lever is rotated in the second direction to remove the steering wheel mount from the core;
wherein at least one of an audible or tactile confirmation is present in both rotational directions, ensuring the rotating lock mechanism provides user-perceivable engagement states for both retention and removal;
wherein the audible confirmation is produced by at least one of: a detent mechanism, a mechanical click-stop feature, a spring-loaded engagement component, or an electronic feedback system;
wherein the tactile confirmation is generated by at least one of: a resistance change in rotation, a mechanical detent action, a force-feedback element, or an electronic haptic feedback system designed for simulation-based steering setups.

16. The steering wheel assembly of claim 1, wherein all metal components of the rotating lock mechanism and the pull-activated detent mechanism comprise an anodized surface layer;
wherein the anodized surface layer is applied to reduce friction, or to prevent galling, or to maintain precise tolerances between any two mating components;
wherein the anodized surface layer enables rotational or linear movement between any two contacting parts; and
wherein the anodized surface layer is an anodized coating applied to all mating and load-bearing surfaces within the core, steering wheel mount, and hub mount, wherein an anodizing process increases surface hardness, or wear resistance, or anti-galling properties under loads and repeated mechanical engagement.

17. A method for removing a steering wheel from a steering column of a vehicle or from a simulation-based steering system, the method comprising:
providing a steering assembly comprising a steering wheel mount attached to the steering wheel, a core, and a hub mount attached to a hub, wherein the hub is attached to either the vehicle steering column or the simulation-based steering system;
rotating a steering wheel mount lever of the core relative to a body of the core to unlock a rotating lock mechanism;
separating the steering wheel mount from the core to remove the steering wheel from the steering column or simulation-based steering system.

18. A method for attaching a steering wheel to a steering column of a vehicle or to a simulation-based steering system, the method comprising:
providing a steering assembly comprising a steering wheel mount attached to the steering wheel, a core, and a hub mount attached to a hub, wherein the hub is attached to either the vehicle steering column or the simulation-based steering system;
aligning an external distal end portion of the steering wheel mount with a recess proximal end portion of the core;
inserting the external distal end portion of the steering wheel mount into the recess proximal end portion of the core;

rotating a steering wheel mount lever of the core relative to a body of the core to lock a rotating lock mechanism, securing the steering wheel mount to the core.

19. A method for removing a steering wheel from a steering column of a vehicle or from a simulation-based steering system, the method comprising:
provide a steering assembly comprising a steering wheel mount attached to the steering wheel, a core, and a hub mount attached to a hub, wherein the hub is attached to either the vehicle steering column or the simulation-based steering system;
pulling a hub mount release lever of the core relative to a body of the core to disengage a multi-pin detent mechanism, which disengages the core from the hub mount;
separating the steering wheel, steering wheel mount, and core from the hub mount to remove the steering wheel from the steering column or simulation-based steering system.

\* \* \* \* \*